US008725804B2

(12) United States Patent
Gottfried

(10) Patent No.: US 8,725,804 B2
(45) Date of Patent: **\*May 13, 2014**

(54) METHOD AND SYSTEM FOR SHARING BRAND INFORMATION

(75) Inventor: Linda Gottfried, Montclair, NJ (US)

(73) Assignee: Sinoeast Concept Limited, Wanchai (HK)

( * ) Notice: Subject to any disclaimer, the term of this patent is extended or adjusted under 35 U.S.C. 154(b) by 154 days.

This patent is subject to a terminal disclaimer.

(21) Appl. No.: 12/462,144

(22) Filed: Jul. 30, 2009

(65) Prior Publication Data

US 2010/0121918 A1    May 13, 2010

Related U.S. Application Data

(63) Continuation of application No. 10/773,861, filed on Feb. 6, 2004, now Pat. No. 7,685,234, which is a continuation-in-part of application No. 10/176,437, filed on Jun. 20, 2002, now Pat. No. 6,691,155.

(51) Int. Cl.
*G06F 15/16* (2006.01)

(52) U.S. Cl.
USPC .......................................... 709/204; 224/246

(58) Field of Classification Search
USPC ............ 709/204, 224, 246, 206, 203; 705/27, 705/14, 14.26, 36 R, 26; 345/629
See application file for complete search history.

(56) References Cited

U.S. PATENT DOCUMENTS

| 5,625,763 | A | 4/1997 | Cirne | 395/133 |
|---|---|---|---|---|
| 5,835,088 | A | 11/1998 | Jaaskelainen, Jr. | 345/343 |
| 5,854,893 | A | 12/1998 | Ludwig et al. | 395/200.34 |
| 5,880,731 | A | 3/1999 | Liles et al. | 715/758 |
| 5,916,302 | A | 6/1999 | Dunn et al. | 709/204 |
| 5,949,414 | A | 9/1999 | Namikata et al. | 345/332 |
| 6,025,871 | A | 2/2000 | Kantor et al. | 348/15 |
| 6,075,571 | A | 6/2000 | Kuthyar et al. | 348/584 |
| 6,125,115 | A | 9/2000 | Smits | 370/389 |
| 6,167,432 | A | 12/2000 | Jiang | 709/204 |
| 6,195,091 | B1 | 2/2001 | Harple et al. | 345/330 |
| 6,201,859 | B1 | 3/2001 | Memhard et al. | 379/93.21 |
| 6,256,663 | B1 * | 7/2001 | Davis | 709/204 |
| 6,298,348 | B1 * | 10/2001 | Eldering | 705/36 R |
| 6,304,283 | B1 | 10/2001 | Kitagawa | 348/14.06 |
| 6,317,777 | B1 * | 11/2001 | Skarbo et al. | 709/204 |
| 6,323,894 | B1 | 11/2001 | Katz | 348/15 |
| 6,338,044 | B1 | 1/2002 | Cook et al. | 705/14 |
| 6,351,777 | B1 | 2/2002 | Simonoff | 709/250 |

(Continued)

*Primary Examiner* — Le H Luu
(74) *Attorney, Agent, or Firm* — Anova Law Group, PLLC

(57) ABSTRACT

An interactive, computer network based system presents consumers with multimedia brand information via a browser-based interface called the GraffitiWall™. Consumers can use the GraffitiWall™ to modify and display a sponsor's brand information in any way desired. Consumer modifications are immediately communicated to the other member consumers and the advertiser/sponsor. Consumers can rate the GraffitiWall™, or portions thereof, and email the GraffitiWall™. An archive of GraffitiWalls™ is maintained by the system. Consumers participate in online focus groups, one-to-one interviews and discussions, as well as games and promotions pertaining to the brand. Interaction with consumers through focus groups, one-to-one interviews, discussions, games and promotions allows the hosting company to reinforce brand equities; speak directly to their target audience; test new and updated products and services; and encourage participation to a brand via purchases and signups by rewarding the participant with coupons, samples, gift certificates, and the like. An ongoing dialogue between business and consumer, as well as consumer-to-consumer, nurtures customer participation, loyalty and satisfaction, and builds a community housed within the company's brand.

20 Claims, 35 Drawing Sheets

(56) References Cited

U.S. PATENT DOCUMENTS

| | | | |
|---|---|---|---|
| 6,405,175 B1 * | 6/2002 | Ng | 705/14.26 |
| 6,490,614 B1 * | 12/2002 | Shaffer et al. | 709/206 |
| 6,559,863 B1 | 5/2003 | Megiddo | 715/753 |
| 2001/0007332 A1 | 7/2001 | Kjonaas et al. | 235/379 |
| 2001/0027410 A1 | 10/2001 | Ueda | 705/10 |
| 2001/0034664 A1 | 10/2001 | Brunson | 705/26 |
| 2001/0038033 A1 | 11/2001 | Habib | 235/375 |
| 2001/0039519 A1 * | 11/2001 | Richards | 705/27 |
| 2001/0049625 A1 * | 12/2001 | Mowry | 705/14 |
| 2001/0056395 A1 | 12/2001 | Khan | 705/37 |
| 2002/0049812 A1 * | 4/2002 | Nahon | 709/204 |
| 2002/0072955 A1 | 6/2002 | Brock | 705/10 |
| 2002/0073151 A1 * | 6/2002 | Rogers et al. | 709/204 |
| 2002/0118218 A1 * | 8/2002 | Voticky et al. | 345/629 |
| 2002/0184104 A1 * | 12/2002 | Littman | 705/26 |

* cited by examiner

Figure 2.5

METHOD AND SYSTEM FOR SHARING BRAND INFORMATION

CROSS-REFERENCE TO RELATED APPLICATIONS

This application is a continuation of U.S. patent application Ser. No. 10/773,861, filed on Feb. 6, 2004 and issued as U.S. Pat. No. 7,685,234 on Mar. 23, 2010, which is a continuation-in-part of U.S. patent application Ser. No. 10/176,437, filed Jun. 20, 2002, and issued as U.S. Pat. No. 6,691,155 on Feb. 10, 2004, the disclosure of which is hereby incorporated by reference.

BACKGROUND OF THE INVENTION

1. Field of the Invention

The present invention relates to a web-based information sharing system; and more particularly, to a computer interface enabling companies and consumers to share brand information over the World Wide Web.

2. Description of the Prior Art

Advertising offers value to the consumer by introducing the consumer to new products, about which the consumer would not otherwise be informed. At times, these may even be essential products that substantially benefit the consumer's health, finances, and quality of life. Notably, over the past fifty years, the nature of advertising has been evolving to reflect the increasing sophistication and technological innovation characteristic of today's media. To a certain extent, today, advertising can even be characterized as an art form. Advertising has become more pervasive and the consumer's acceptance of advertising has increased.

One recent advertising development is the use of movies as a medium for brand reinforcement. For example, the popular movie, "E.T." shows a character clearly eating Hershey's Reese's Pieces®, rather than a generic chocolate candy. Characters in the movie, "The Client", reach for clearly labeled soda products to calm themselves. The movie, the "Matrix" features telephones identifiable as Nokia® brand. Consumers seem to accept this form of advertising, as adding realism to the story a movie has to tell, as long as it doesn't involve potentially harmful products such as alcohol or cigarettes. In addition, consumers gladly purchase memorabilia related to movies and television shows such as Mickey Mouse watches, E.T. dolls, and Spiderman costumes, which are in and of themselves, a form of advertising. Consumers have adopted advertisements as status goods so that the line between advertisement and product has become blurred.

Most recently, the World Wide Web (Web) has become an additional medium for brand reinforcement. However, studies show that pop-up ads and banner ads, along with unsolicited email, annoy consumers and may provide limited benefit to the advertising companies. Consumers are ready for a method of interacting creatively with brand information, particularly graphical information, over the Web and advertisers are equally anxious for the instant consumer feedback the Web can provide. Advances in software and hardware, as well as an increase in available bandwidth, now make this feasible. In addition, consumers seem to welcome using the Web as a means to share their evaluation of products whether through the form of book reviews on www.amazon.com® or product evaluations on a wide variety of sites. The prior art describes some attempts to use the Web for sharing information.

Video conferencing was an early attempt to enable users to interact and share documents over the Web. Collaborative video conferencing software currently exists which enables individuals, located at physically dispersed locations, to view the same data over the Web and to modify it. For example, U.S. Pat. No. 6,317,777 B1 to Skarbo et al., entitled "Method for Web Based Storage and Retrieval of Documents," describes a method by which a presenter can share a file with other conference attendees and update the shared document with the changes made to the document during the conference sharing. A document server incorporates a revision control system to allow a history of the documents to be maintained on the server. The server can present a list of current document versions as well as previous versions, thereby allowing the attendees to review the document in all its previous forms.

Also known in the art are networked systems, which enable conference attendees to create or modify information and to share it over the Web. For example, attendees can draw on a whiteboard accessible to all the attendees, using standard geometric shapes such as lines and circles. The attendees can exchange not only text files but also, video, audio, and graphics files. Further, the attendees can communicate via a chat function, which is a real-time, interactive, textual based conference tool that allows attendees to post messages to each other in a shared area. Such a system is described in U.S. Pat. No. 6,195,091 B1 to Harple et al. entitled "Apparatus for Collaborative Computing."

More recently, focus groups, which are discussions that enable marketers to acquire feedback from a group of participants regarding new products, are being conducted over the Web. U.S. Pat. No. 6,256,663 to Davis entitled "System and Method for Conducting Focus Groups Using Remotely Loaded Participants Over a Computer Network" describes how a chat function can be used to implement a focus group. In the described system, the focus group members, the group moderator, and the client presenting the new product are all located remotely from each other and communicate via the Web. The focus group members can view the messages each member transmits but cannot view the messages the client and moderator transmit to each other.

Consumers are now ready for an online environment in which they can creatively express and communicate their feelings about products as members of a virtual community. Specifically, what the prior art does not provide is a computer network based system that enables the consumer to modify brand information in a way that instantly reflects the consumer's thoughts, wishes, and desires for what the brand should be, and also rewards the consumer for the consumer's efforts. Also needed is a computer network based environment for immediately communicating the consumer's input to both other consumers and the advertiser. Further needed is the ability to easily adapt this system to any brand desired.

SUMMARY OF THE INVENTION

The present invention provides a computer network based system and method whereby consumers can interact with brand information and with each other. The invention is implemented over the Web, an intranet, or other network system. Consumers interact with a server, or a plurality of servers, in client server mode, using a standard browser, such as Microsoft Internet Explorer™ or Netscape Navigator™. Each consumer registers as a member and receives an identifying username (handle). Such a system can be available to the consumer twenty-four hours a day, seven days a week.

The consumer interacts with a multimedia interface known as the GraffitiWall™, which offers several different types of interaction. In Create Mode, the advertising sponsor or sponsors provide the consumer with a variety of multimedia elements such as audio files, video clips, icons, text, and photographs, which the consumer can place on a virtual Wall™, (GraffitiWall™) within a frame window, in any way the consumer desires. The elements include information pertaining to the brand, for example, a picture of a bathing suit being offered for sale or being considered for sale as a new product or lingerie that a retailer wishes to market. Products of this nature generally must be tried on before purchase and some consumers may be embarrassed to try them on in a public environment such as a store dressing room.

Using the GraffitiWall™, the consumer can create a virtual lingerie model by uploading personal information such as an image of the consumer's body, placing it on the Wall™ and then superimposing an image of the lingerie, provided by the sponsor on a pop-up window The consumer can then use the Wall™ manipulation tools to resize the lingerie image and to manipulate it to best fit the consumer's body. Doing so enables the consumer to make some decisions about the correct size to order and the fit of the garment. The consumer can also view the virtual lingerie model in motion and develop an understanding of how the consumer would look from various angles, wearing the featured garment; (the ability to render a 3-D animation is well known in the art. In addition, the consumer can manipulate and modify the color, fabric-type and pattern thereby providing invaluable information to the sponsor. By reading and listening to their audience's desires and needs the sponsor is better informed to design next season's lingerie line.

Finally, the consumer can purchase the item online or print a discount coupon. These features of the present invention are of benefit to ecommerce entities because they encourage the consumer to purchase branded items online, which the consumer might not have considered purchasing online, due to the inability to "try on" the items or a reluctance to do so in a public setting. From the store's point of view, they can minimize overstocking merchandise due to being more in tune to their consumer's wants and needs.

Elements that the consumer places on the Wall may appear continually or may pop up only when a visitor to the Wall places the visitor's mouse over a particular object. Consumers can also upload their own objects and place them on the Wall. Types of multimedia which the consumer can upload include video, graphics, animation, audio files and text files. Examples of multimedia objects consumers can upload include audio clips in the .mp3 format and photographs of the consumer or the consumer's home.

As another example, an educational institution can invite a class of students to create their own private "classrooms" on the GraffitiWall™ by uploading photos, videos, presentations, and sound clips. The students can also populate the Wall™ with their assignments or even a dissertation in the form of text and/or other media elements. Each student can create a private Wall™ area to be used by the teacher and student to discuss and review the student's work and which can be updated from time to time.

Consumers are supplied with tools such as a virtual paintbrush, a rotator, and an animator, for example, which a consumer can use to modify any of the objects. The GraffitiWall™ is refreshed periodically so that updates by the individual consumers can be shared.

The consumer can also interact with the GraffitiWall™ in Rate Mode. Consumers can vote on either the entire GraffitiWall™ or a particular area of the Wall. This enables the advertiser to immediately determine what the consumers like and dislike about the brand.

The consumer can also interact with the GraffitiWall™ in Interact Mode. A sponsor places images of new products or new concepts on the Wall for the consumer to review, sample, and rate. The sponsor has control over all information that the consumer sees, and can tailor that information to each individual user. Consumers involved in the rating activity comprise a virtual focus group composed of a plurality of one-to-one interviews and group discussions with the sponsor. The sponsor rewards consumer participants with coupons, samples or other perquisites related to the sponsor's brand. GraffitiWall™ provides a feedback tool where sponsors can directly communicate with their audience through multimedia.

Interact Mode is also enhanced by guest hosting. The GraffitiWall™ features a celebrity host, who is available to communicate real time with the consumer through a chat. The host interacts with the consumer by inviting the consumer to compete in a special event. For example, a super model host might invite the consumer to participate in a fashion show in which the consumer competes to create the best-dressed model. An image of the super model appears on the GraffitiWall™ along with the samples of the sponsor's merchandise and the consumer manipulates these elements as the consumer wishes. Not only does this activity create brand excitement and familiarize the consumer with the product available, but also, the sponsor can instantly understand what the consumer deems to be most attractive.

An archive of favorite GraffitiWall™ sessions, focus groups and events is available for consumers to review in the Review Archive. The Review Archive functions as a living scrapbook and can be updated as often as the sponsor desires. The Review Archive, which contains the best of what the Graffiti Wall has offered, enables both the consumer community and the sponsor to better understand the nature of the sponsor's brand and the members' likes and dislikes.

The consumer can also interact with the GraffitiWall™ in Send Mode. The consumer can send a personal note and a snapshot of the functioning Wall™ to friends and family. The image of the functioning wall provides the email recipient with a taste of the playfulness of the GraffitiWall™ and acts as a viral marketing tool, encouraging the recipient to join the virtual community of Wall™ users. The consumer can also email a hyperlink to a specific GraffitiWall™, in postcard format, to friends and family or to the sponsoring company.

The consumer can also interact with the GraffitiWall™ to participate in special events or games. For example, the GraffitiWall™ may present the consumer with a scavenger hunt interface. The GraffitiWall™ is loaded with many different multimedia elements such as images, activities, games, headlines, and other tools GraffitiWall™ inherently provides. The consumer is presented with clues, which will lead the consumer to locate and uncover surprises related to the sponsored brand, such as images of hidden products, ads or coupons. Other multimedia elements can be imbedded within the Wall's environment such as radio/TV commercials, brand immersive games and so on.

To attract consumer attention, the GraffitiWall™ also features random events and silly animations. These can include, for example, parades, roller bladders gliding by, or animations of famous dancers.

Among the significant benefits accorded by the GraffitiWall™ are certain enablement and facilitation features, which allows companies to: (i) reinforce their brand equities; (ii) speak directly to their target audience on an ongoing basis; (iii) test new and updated products and services via the Focus Group/Feedback mode; (iv) create an environment, which builds greater customer satisfaction and involvement; (v) build brand communication so customers see and feel the brand as his/her own; and (vi) encourage participation to a brand via purchases and signups by rewarding folks with coupons, samples, and gift certificates. Customers are enabled to express product preferences in a free-form mode using the Web based GraffitiWall™ system, which dynamically stores customer inputs and updates the Wall for viewing by other users. An ongoing dialogue between business and consumer, as well as consumer-to-consumer, nurtures customer participation, loyalty and satisfaction, and builds a community housed within the company's brand. The end results spell greater profits and keep companies on the radar; first and foremost in the minds of their customers.

BRIEF DESCRIPTION OF THE DRAWINGS

The invention will be more fully understood and further advantages will become apparent when reference is had to the following detailed description and the accompanying drawings, in which.

DESCRIPTION OF THE PREFERRED EMBODIMENTS

Figure 1:
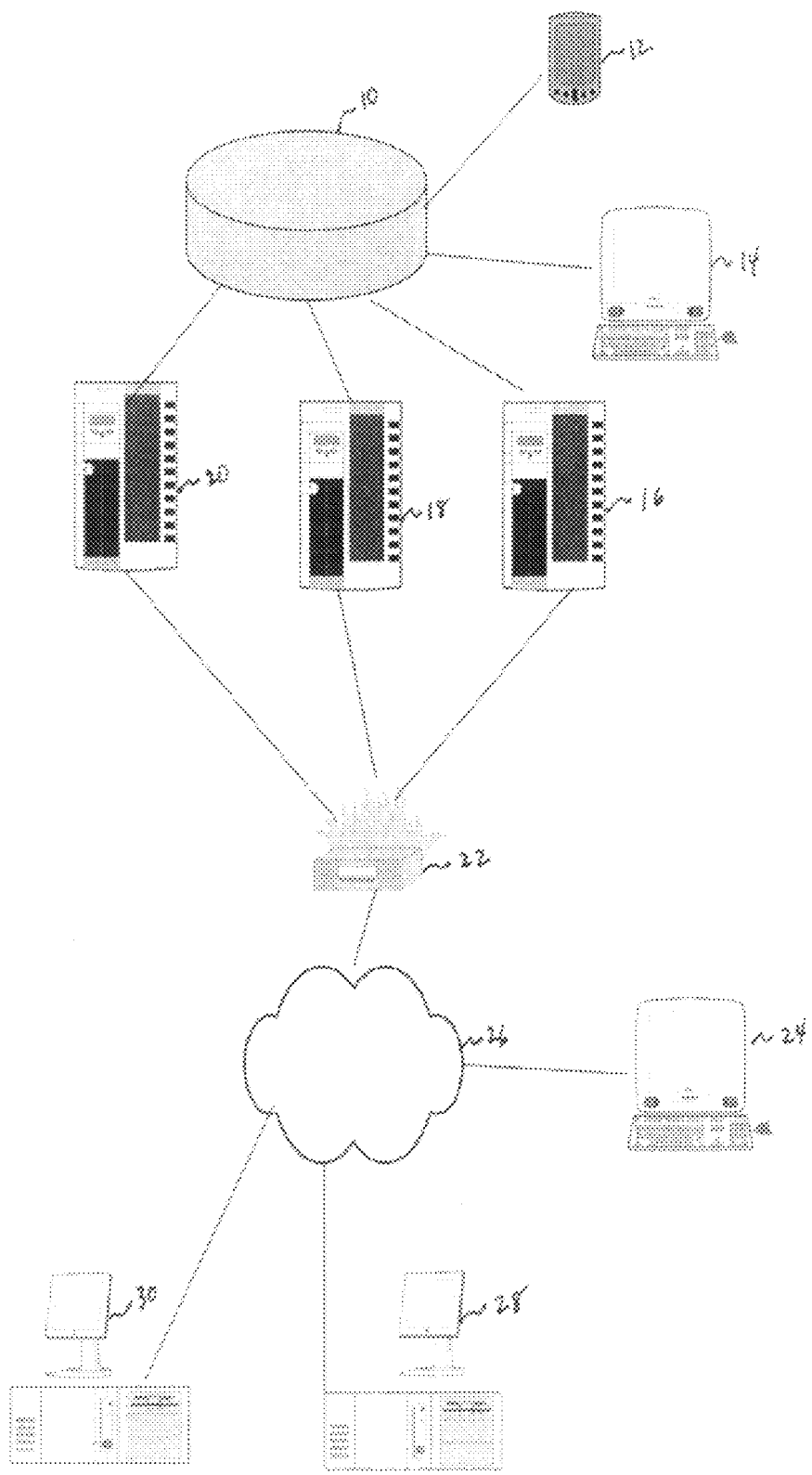
FIG. 1 is a block diagram illustrating the functional components of a system on which the present invention can be implemented.
Figure 3:
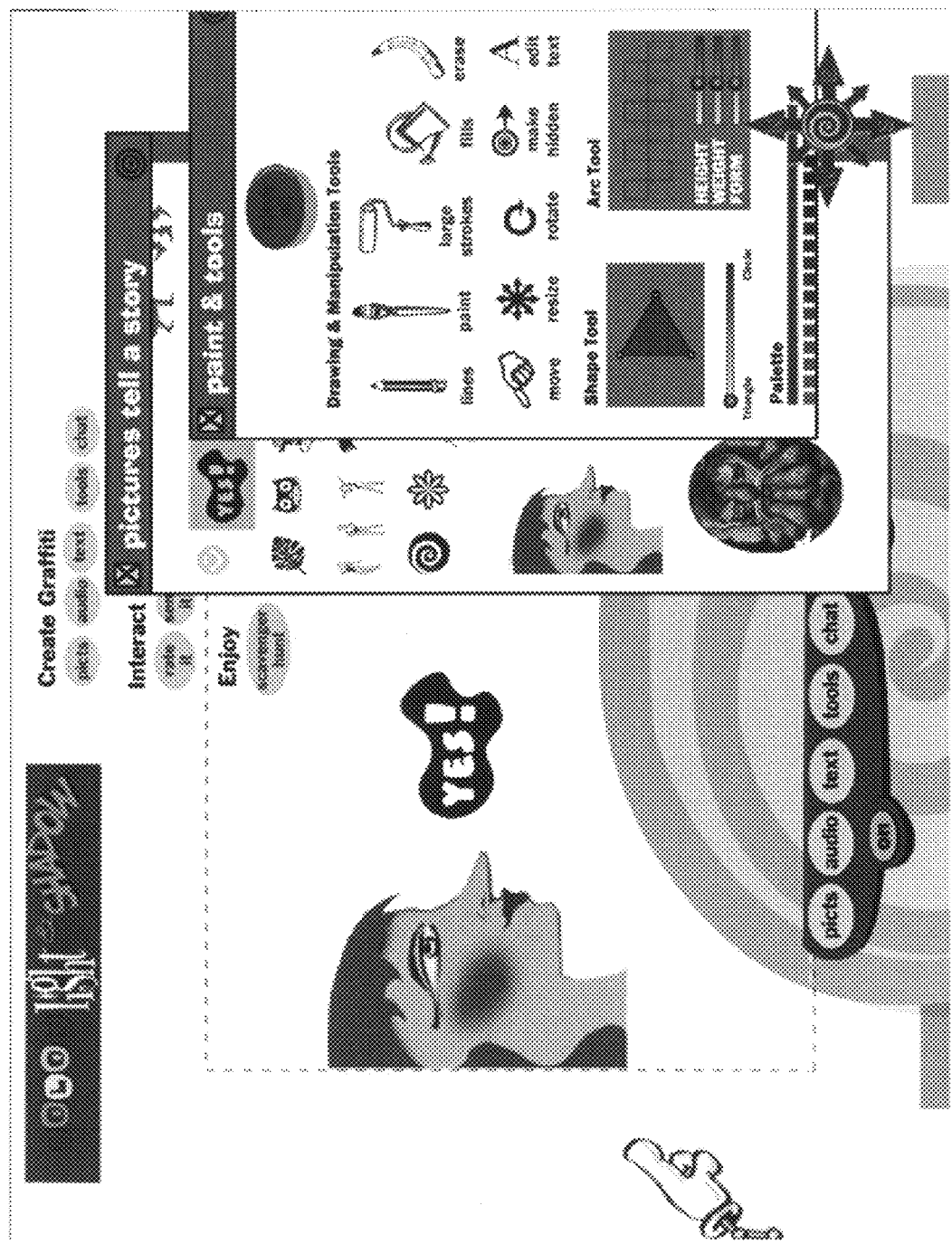
FIG. 3 is a sample screen shot showing a sample Picts Palette and a sample Tools Palette.

FIG. 1 shows example hardware for the present system. The database server 10, stores the entire historical state of the GraffitiWall™ FIG. 3 reference numeral 110, the brand information used to create the Wall, the Graffiti added by consumers, consumer demographic information, and survey and Focus Group/Feedback data provided by the consumers. Information stored in the database server 10 may take the form of tables comprising a relational database, for example. The database server 10 is connected to a plurality of product information servers 16, 18, 20. To support scaling, multiple product information servers 16, 18, 20 can serve visitors to a single GraffitiWall™. The product information servers 16, 18, 20 interact with the database server 10 on behalf of the consumer workstations 28, 30 to minimize the load on the database server 10 by caching information. There may be any number of servers 16, 18, 20 or the servers 16, 18, 20 can be eliminated, in which case the database server 10 is directly connected to the firewall 22. There may also be more than one database server 10 and any number of consumer workstations 28, 30. The product information servers 16, 18, 20 are augmented standard Web servers and handle the following types of requests: retrieve page (standard HTML); retrieve Wall section (by area and time); add/update graffiti; return Wall snapshot; retrieve chat; send chat message; add user; validate user; update user; update user demographics; and update user survey.

The firewall 22 insulates the database server 10 from the Internet 26. The database server 10 can also be connected to a personal digital assistant (PDA) 12 or other portable device such as a cell phone or laptop. A system administration workstation 14 is connected to the database server 10 for managing the database server 10. A plurality of consumer workstations 28, 30 communicate with the database server 10 and the product information servers 16, 18, 20 via the Internet 26 and the firewall 22. A sponsor workstation 24 communicates with the database server 10 in the same manner as the consumer workstations described above. The system may also be implemented in an intranet environment as is well known in the art. Also, any consumer workstation 28, 30 can function as a kiosk connected over an intranet to the database server 10.

The consumer workstations 28, 30 use standard browser software, such as Microsoft's Internet Explorer®, to communicate with the database server 10. GraffitiWall™ Visitor Software can be provided to the consumer workstations 28, 30 in the form of an ActiveX control Java Applet or Shockwave Movie, for example. Images are stored as vector graphics using Flash® or similar technologies. The GraffitiWall™ Visitor Software will receive and supply data to the product information servers 16, 18, 20 using the HTML and XML over HTTP standard protocols. The GraffitiWall™ Visitor Software can be run either as an Active Server Page, on behalf of sponsors, or it can be delivered to sponsors as a software product, which the sponsors can run on their own server infrastructure. The Visitor Software supports segmenting consumers into demographic or other groups, based upon information stored in the database server 10, such that the GraffitiWall™ and other content displayed can be customized for specific groups and certain sections of the GraffitiWall™ are visible only to members of specific groups.

Graffiti created by consumers is stored as a series of instructions, or opcodes, that manipulate the GraffitiWall™. An example of an opcode might be "color all pixels black in the first line of the Wall." The use of opcodes enables the system to display any version of the Wall, and the process of constructing it, at any time and as many times as desired. The relational database stored on the database server 10 contains a record of each media object created, its position, the user who created it, and the GraffitiWall™ it was created on. Accordingly, it is not necessary to store multiple copies of the GraffitiWall™, but rather, only time stamped modifications to the Wall. The consumer can easily email a "snapshot" of the Wall, taken at any time, as the Wall history is maintained on the database server 10.

Figure 4:
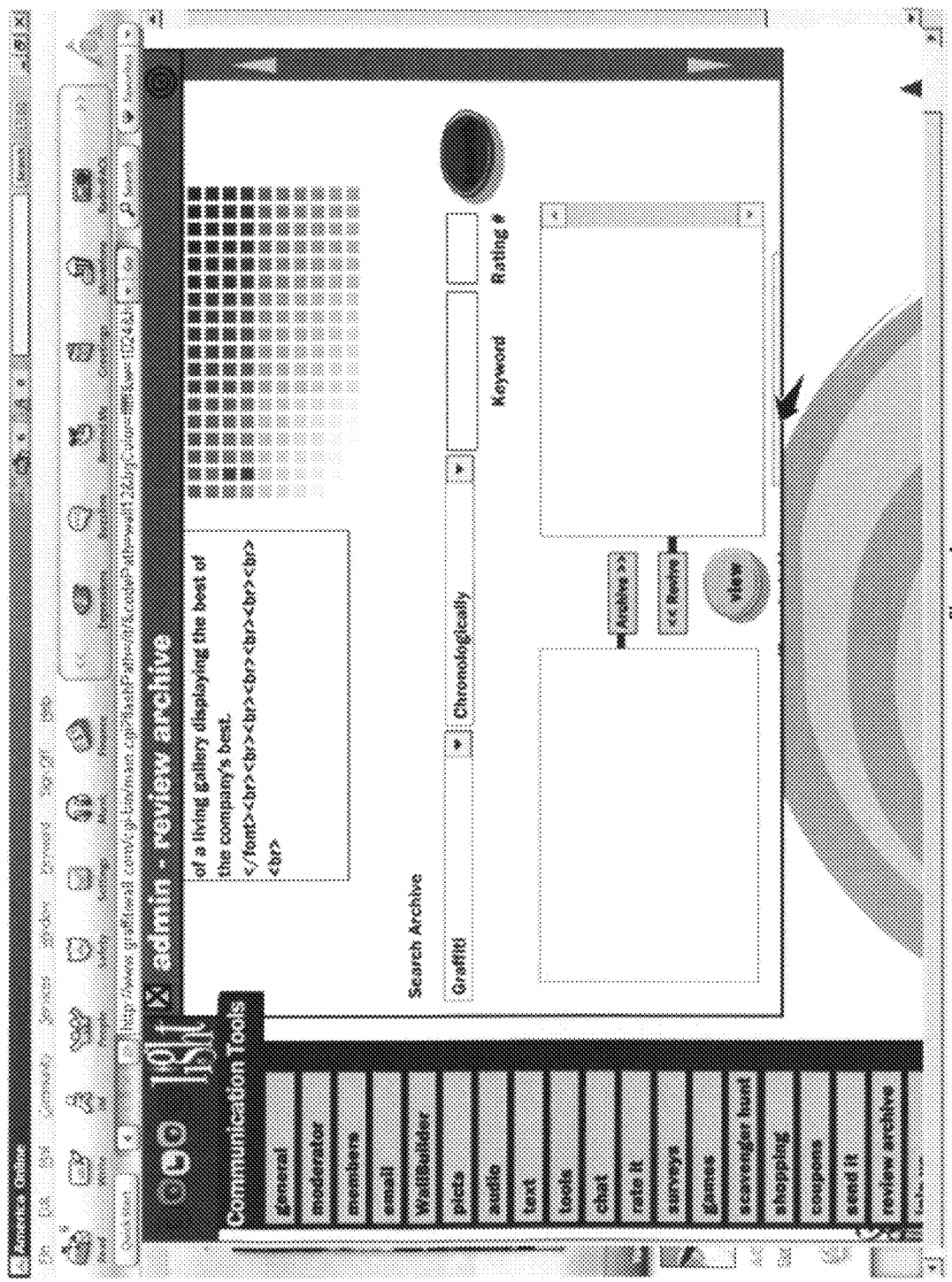
FIG. 4 is a sample screen shot showing a screen with which the administrator can manipulate the Review Archive.
Figure 5:
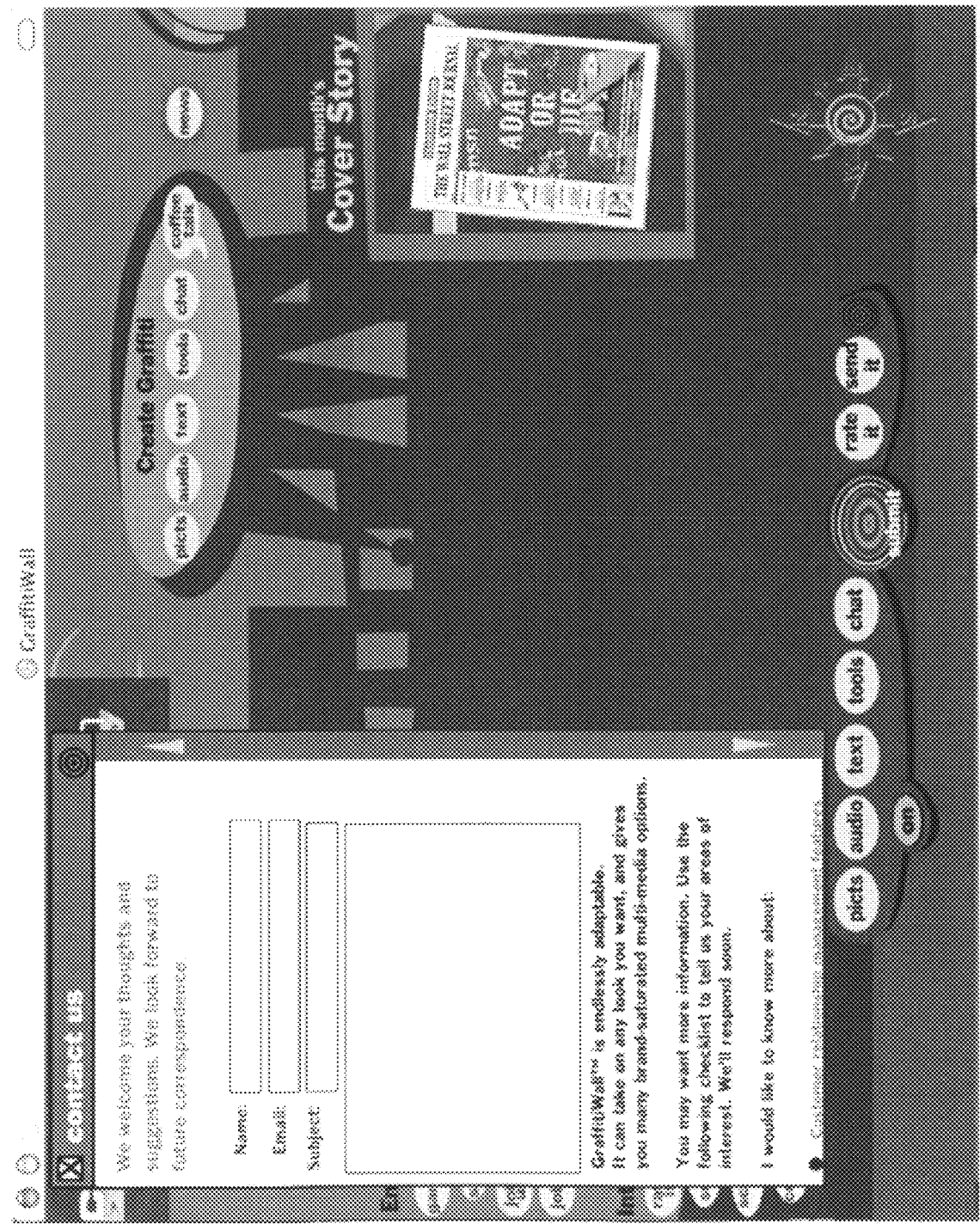
FIG. 5 is a sample screen shot showing a Contact Us form which a consumer can use to contact a Wall™ sponsor.
Figure 6:
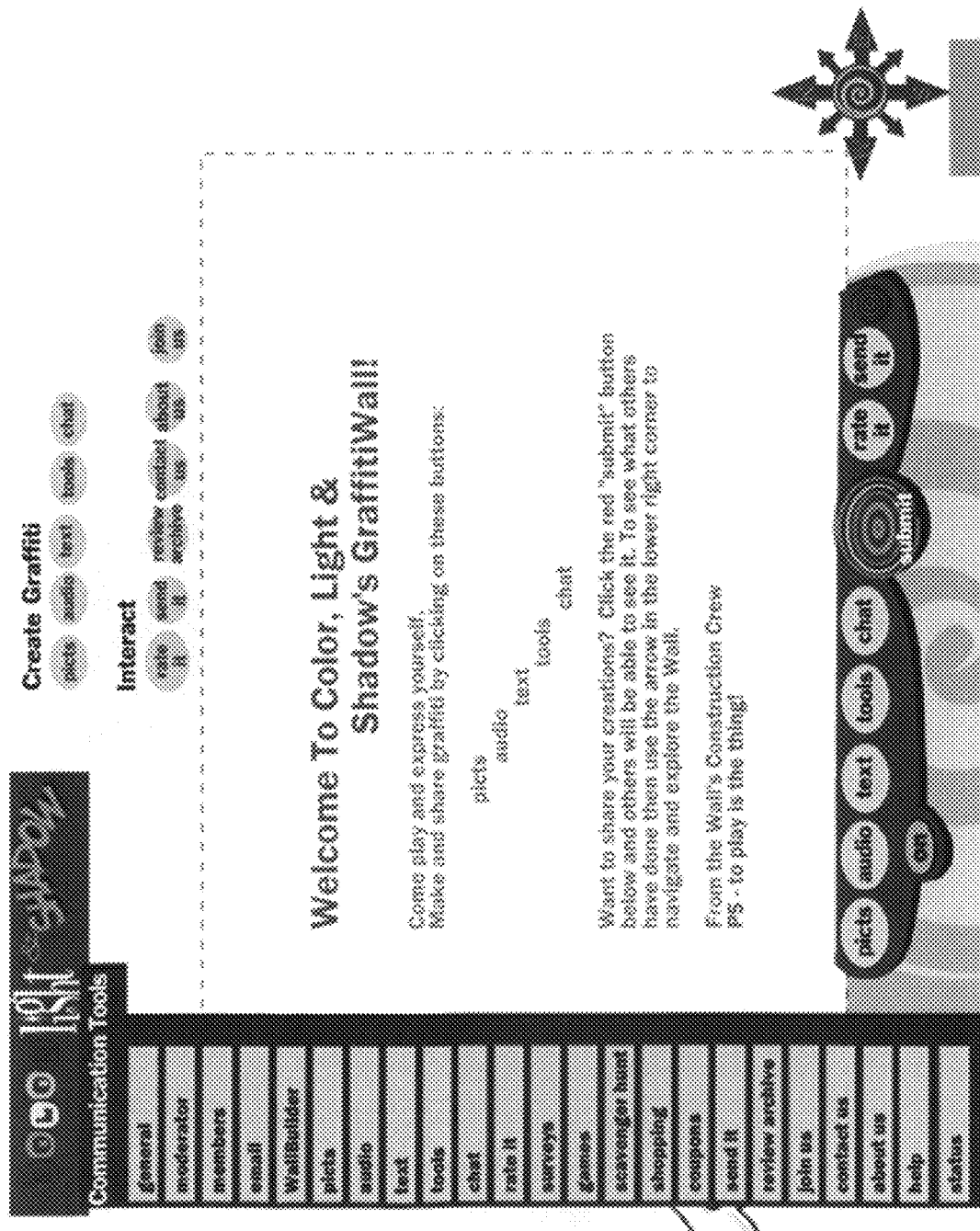
FIG. 6 is a sample screen shot showing the Admin Tools.
Figure 7:
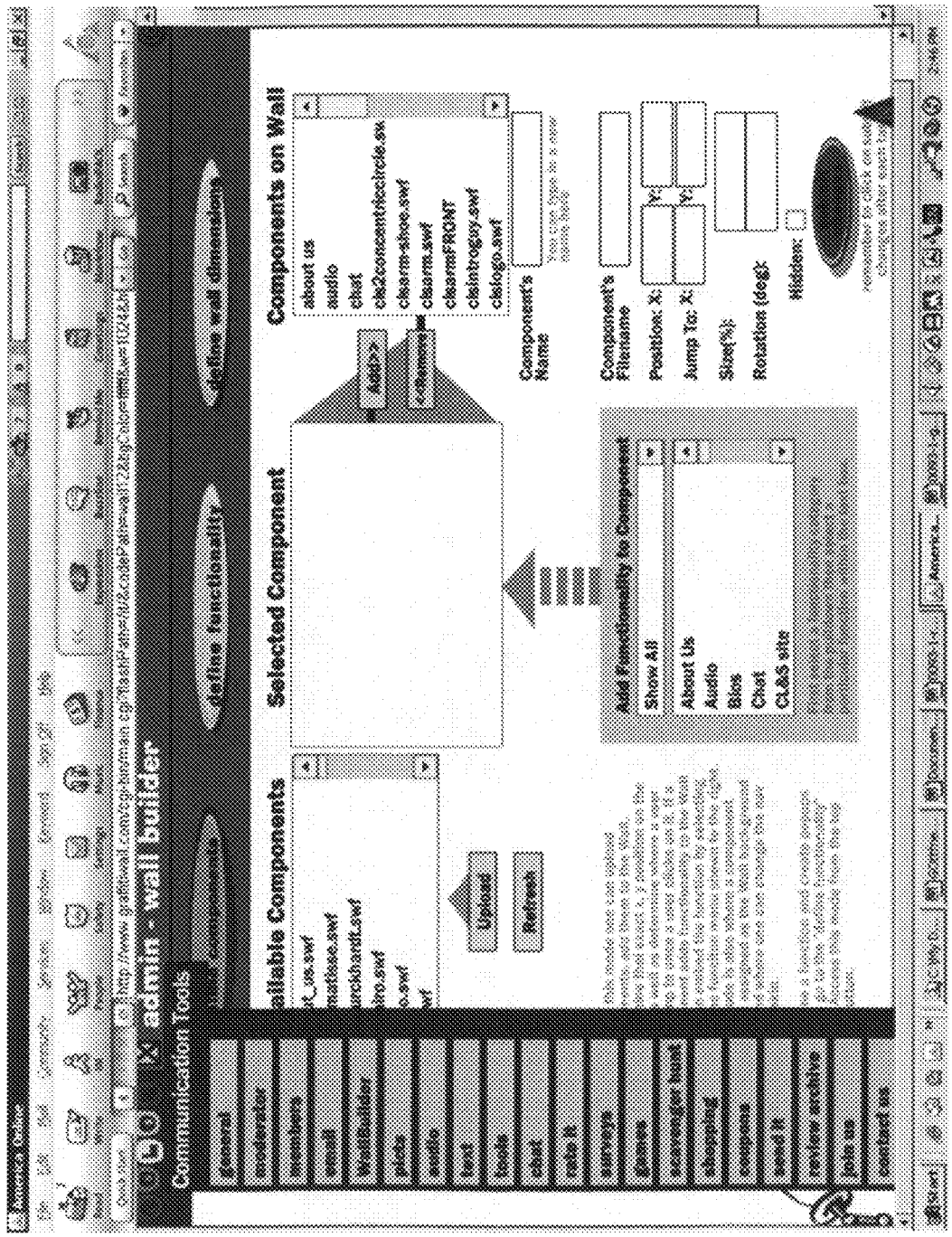
FIG. 7 is a sample screen shot showing the Wall Builder which is used to create new Graffiti Walls™.
Figure 25:
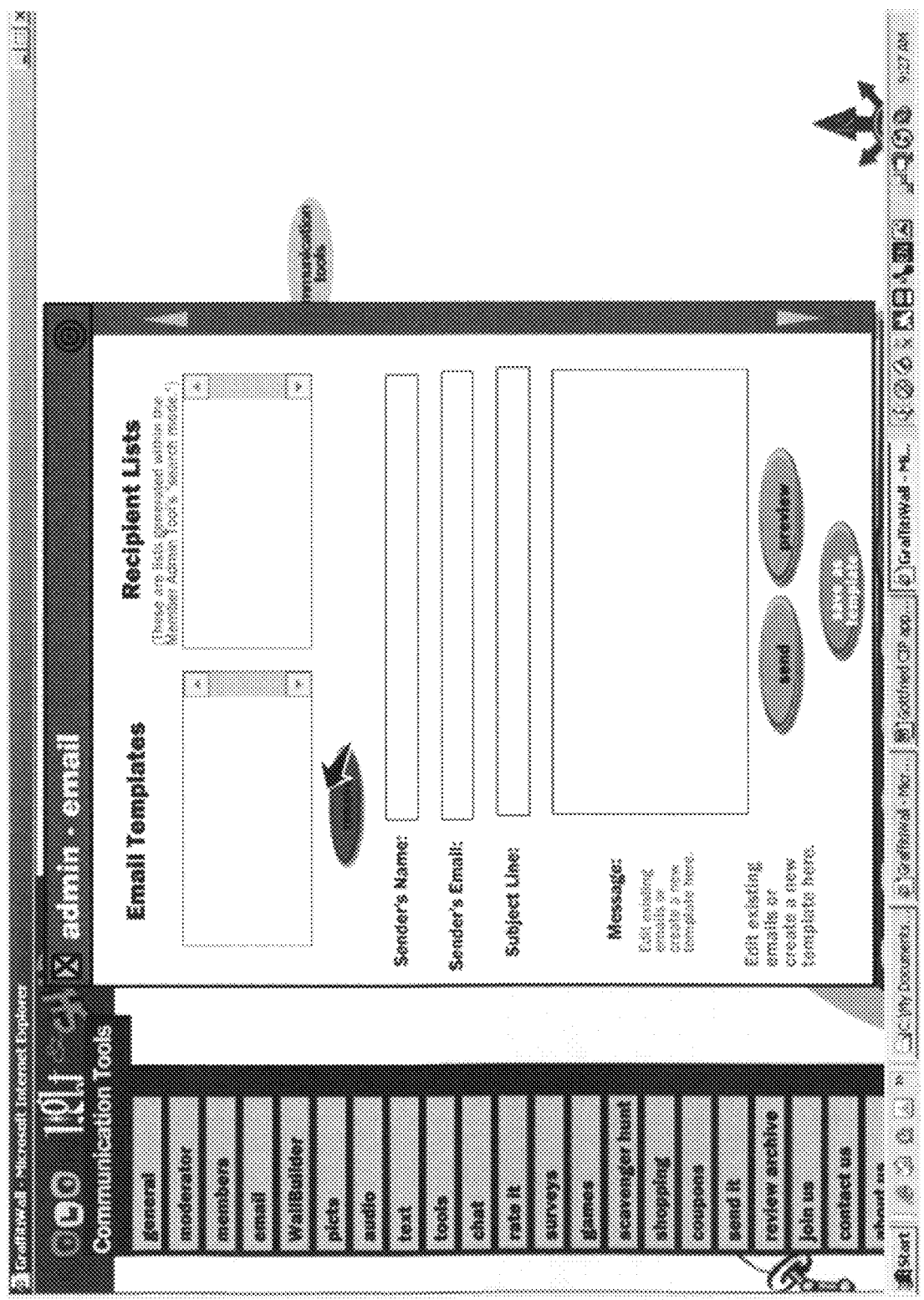
FIG. 25 is a sample screen shot of the Email Admin Tool.
Figure 27:
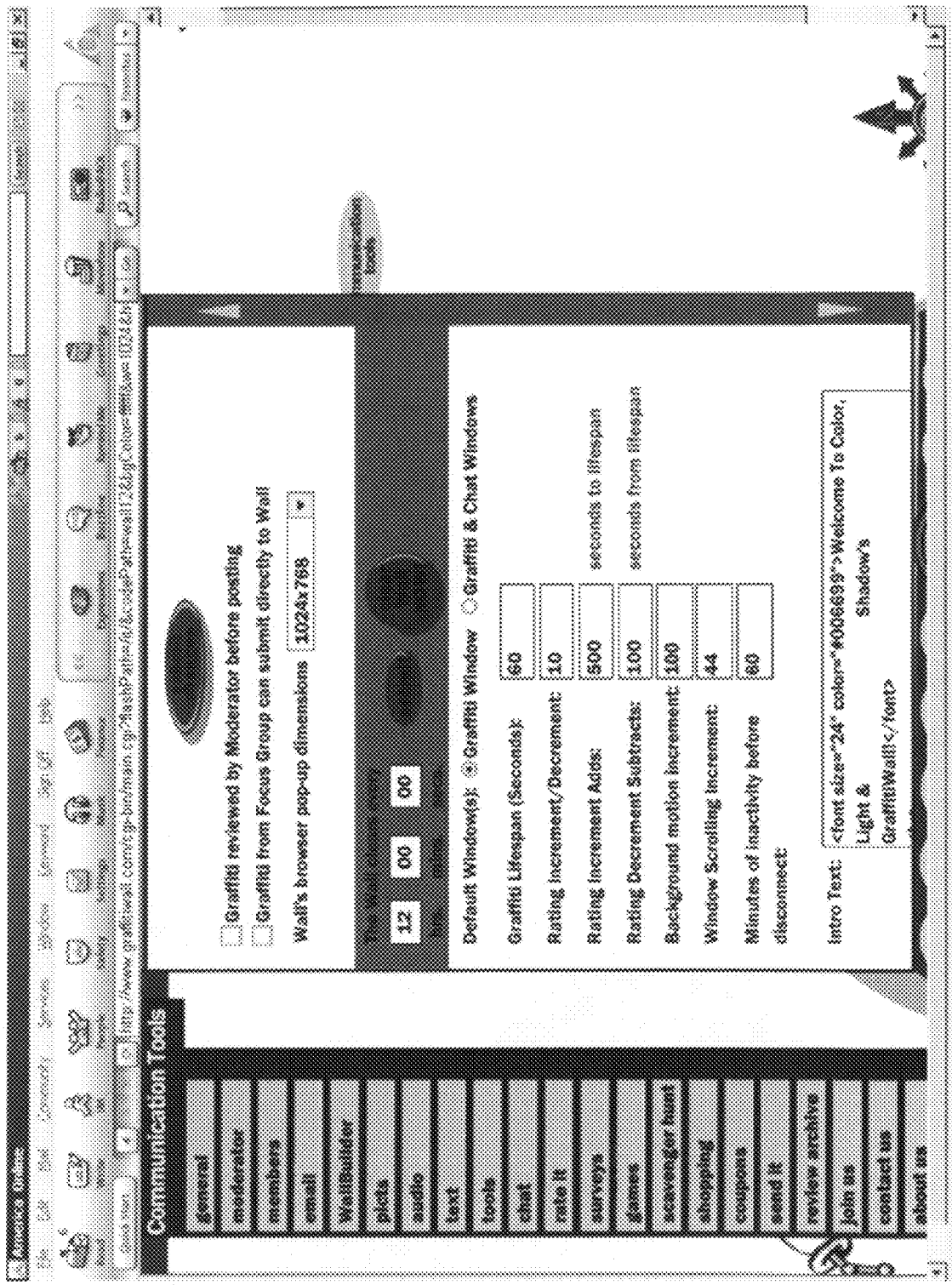
FIG. 27 is a sample screen shot of the General Admin Tool.
Figure 32:
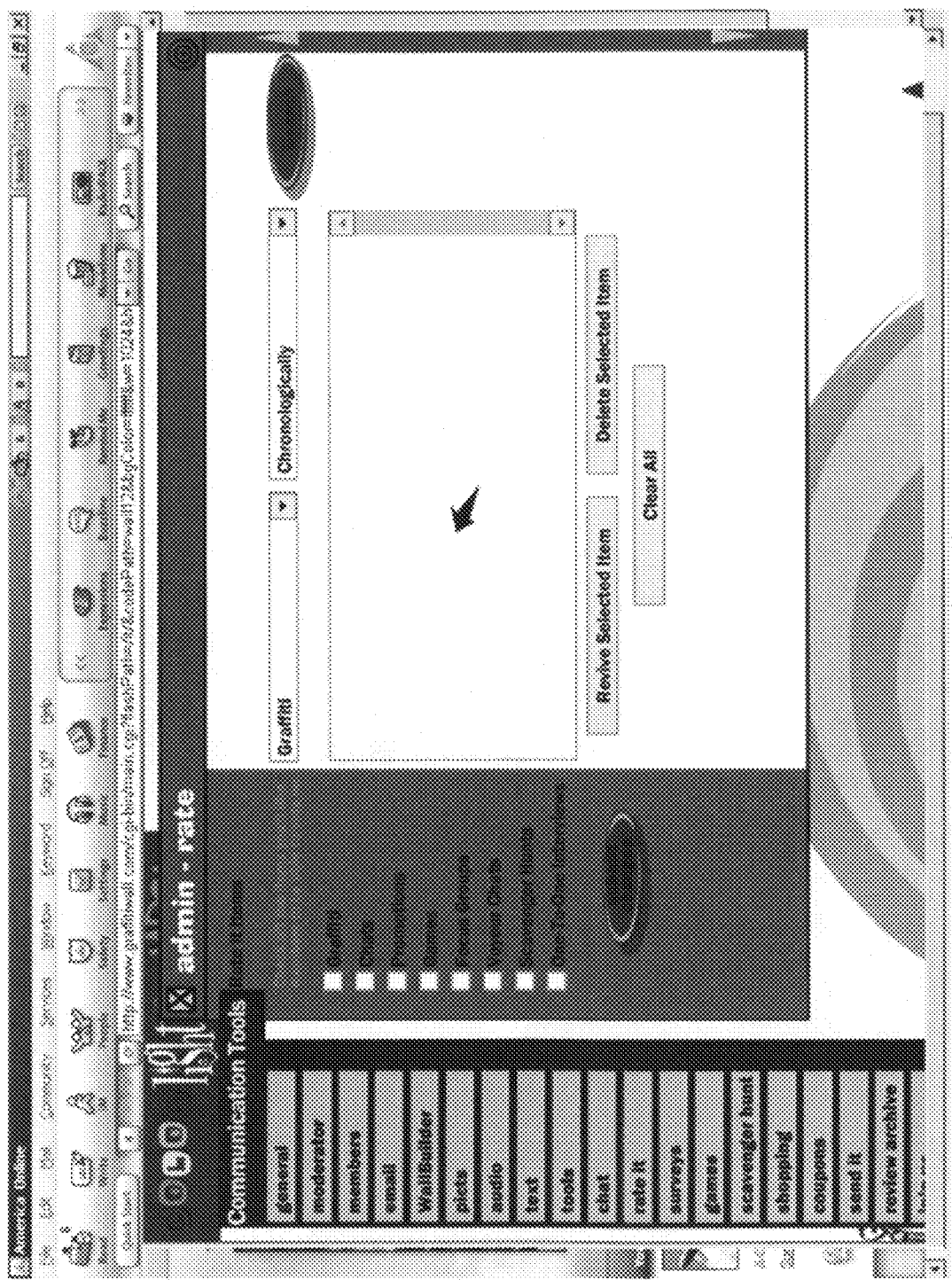
FIG. 32 is a sample screen shot of the Admin Rate Tool.
Figure 33:
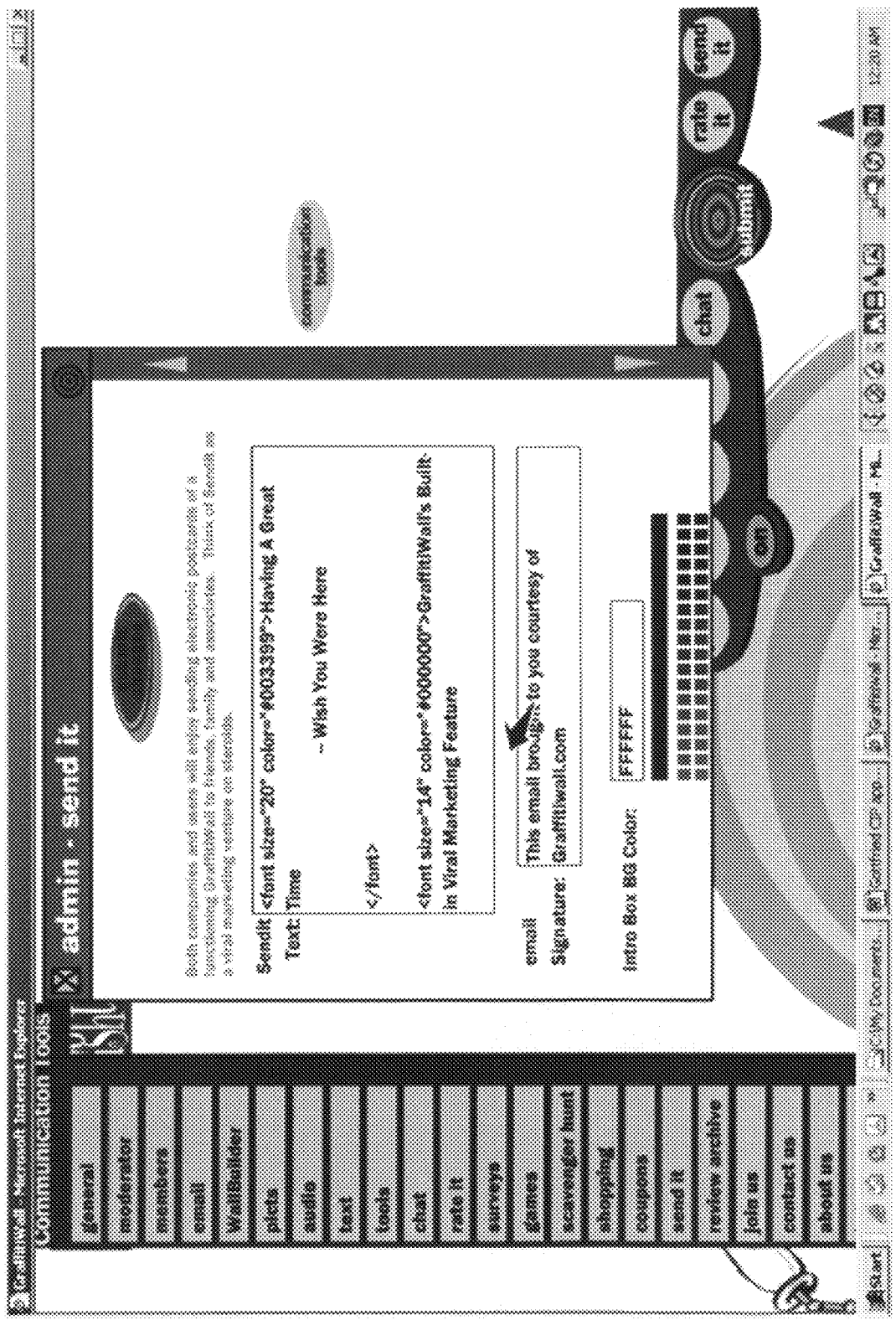
FIG. 33 is a sample screen shot of the Admin Sent It Tool.
Figure 34:
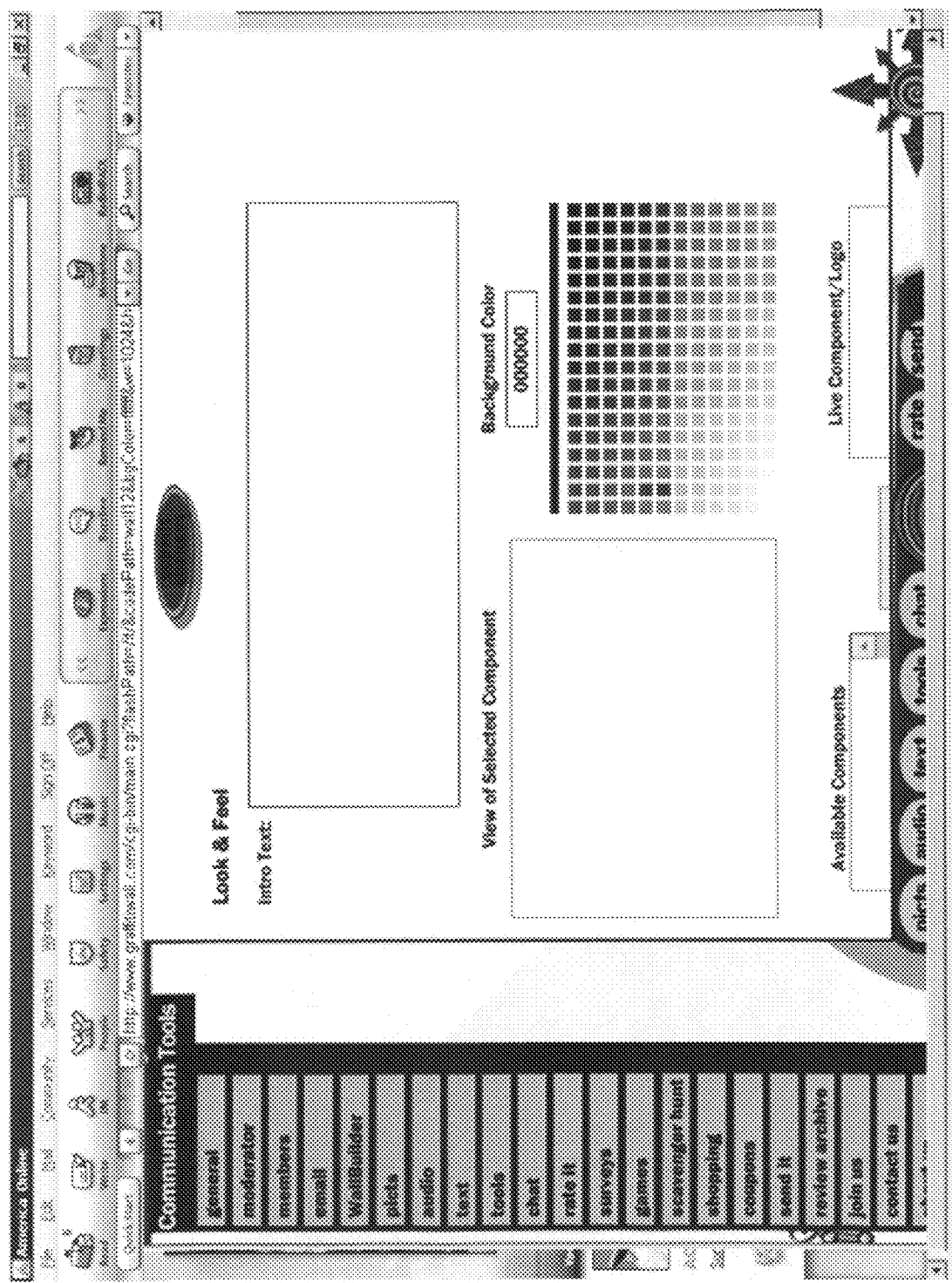
FIG. 34 is a sample screen shot of the Admin Join Us Tool.
Figure 35:
FIG. 35 is a sample screen shot of a Send-It e-postcard as seen by the recipient.

The system administration workstation 14 is equipped with Administrative Control Panel (ACP), Admin Tool Set, or Admin Tools FIG. 6 which is browser-based software that enables an administrator to maintain the GraffitiWall™ by adding and deleting information as necessary, to update the Wall to reflect consumer input, and to produce reports of consumer activity on the Wall. The GraffitiWall™ refreshes at least once a day and the timing can easily be adjusted via the General Admin Tool. The backbone of the GraffitiWall™ is its Admin Tools FIG. 6. Through these powerful and easy-to-use Administration Tools, sponsors can continually change the GraffitiWall™ environment FIG. 27, activities FIG. 7, feedback mechanisms FIG. 16, FIG. 29, FIG. 32, targeting FIG. 19, customer service responses FIG. 5, and email campaigns FIG. 25 and FIG. 35. The Admin Tools FIG. 6 also provide great flexibility for continually querying the database of GraffitiWall™ data FIG. 4. Customization of features is easy; sponsors can add and subtract features, assets, and functionality FIG. 7, serving many communication needs, down to the micro-level. For example, if a sponsor wants to prevent consumers from manipulating an asset like a logo, the sponsor removes this capability from the logo item FIG. 7 reference numeral 625. Also, through the ACP, new Graffiti-Walls™ can be created with the appropriate text, media, and options for any brand or client using the Wall Builder FIG. 7.

In other embodiments, branding need not be the focal point of a Wall™ but can be used as a backdrop for storytelling. Sponsors and private users can create sub-Walls which are only accessible to invited guests. Multiple Walls™ can be provided for a single company with each Wall™ being targeted at a different audience. For example a particular Wall™ is reserved for the most loyal members/consumers and a different Wall™ is reserved for females in the Northeast who have purchased a particular product within the current year. Some examples of Graffiti Walls™ for sponsor and institutional use are: Ecommerce, Communication, Community Building, Training, Promotion, Market Research, Branding, Education, Crisis Management, and Entertainment. Some examples of Graffiti Walls™ for individual use are: Community, Communication, Personals, Entertainment, and Family trees.

Graffiti Walls™ can be located through a GraffitiWall™ Directory because GraffitiWall™ information is stored, in a relational database FIG. 1 reference numeral 10, for example. Consumers can search for Walls™ by category such as Automotive, Travel, Shopping, Technology and Gaming. Consumers can also search for walls by attitude, e.g. Martha Stewart Living, Frugal Living, Lux Life or Extreme Living. Consumers can also search for walls by popularity (most visited Walls™ listed in descending order) or by keyword.

Like the Yellow Pages, the GraffitiWall™ Directory provides ad space on the various searching pages and the results pages, with ads on the more targeted pages being more costly.

Figure 19:
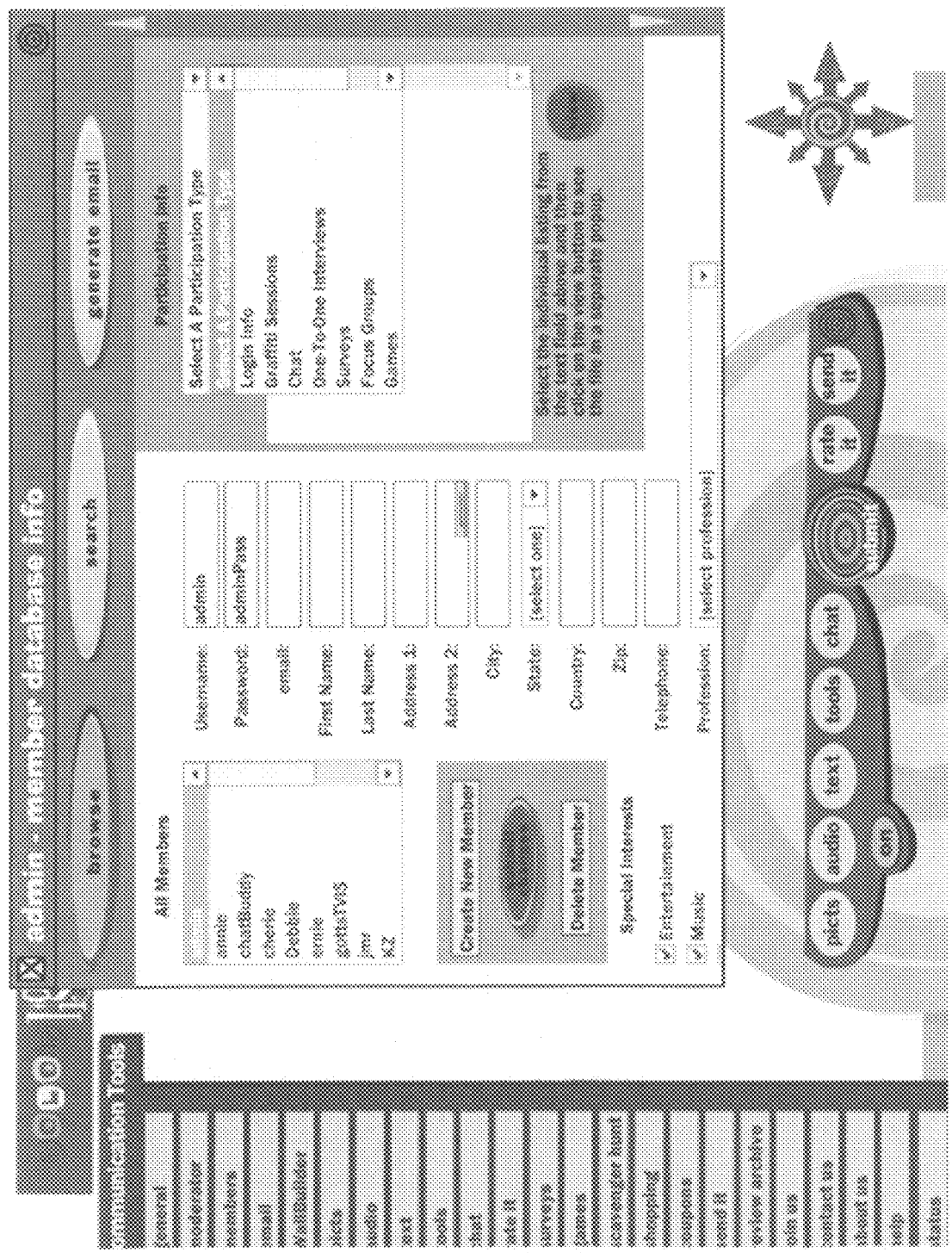
FIG. 19 is a sample screen shot of the Member Admin Tool.
Figure 28:
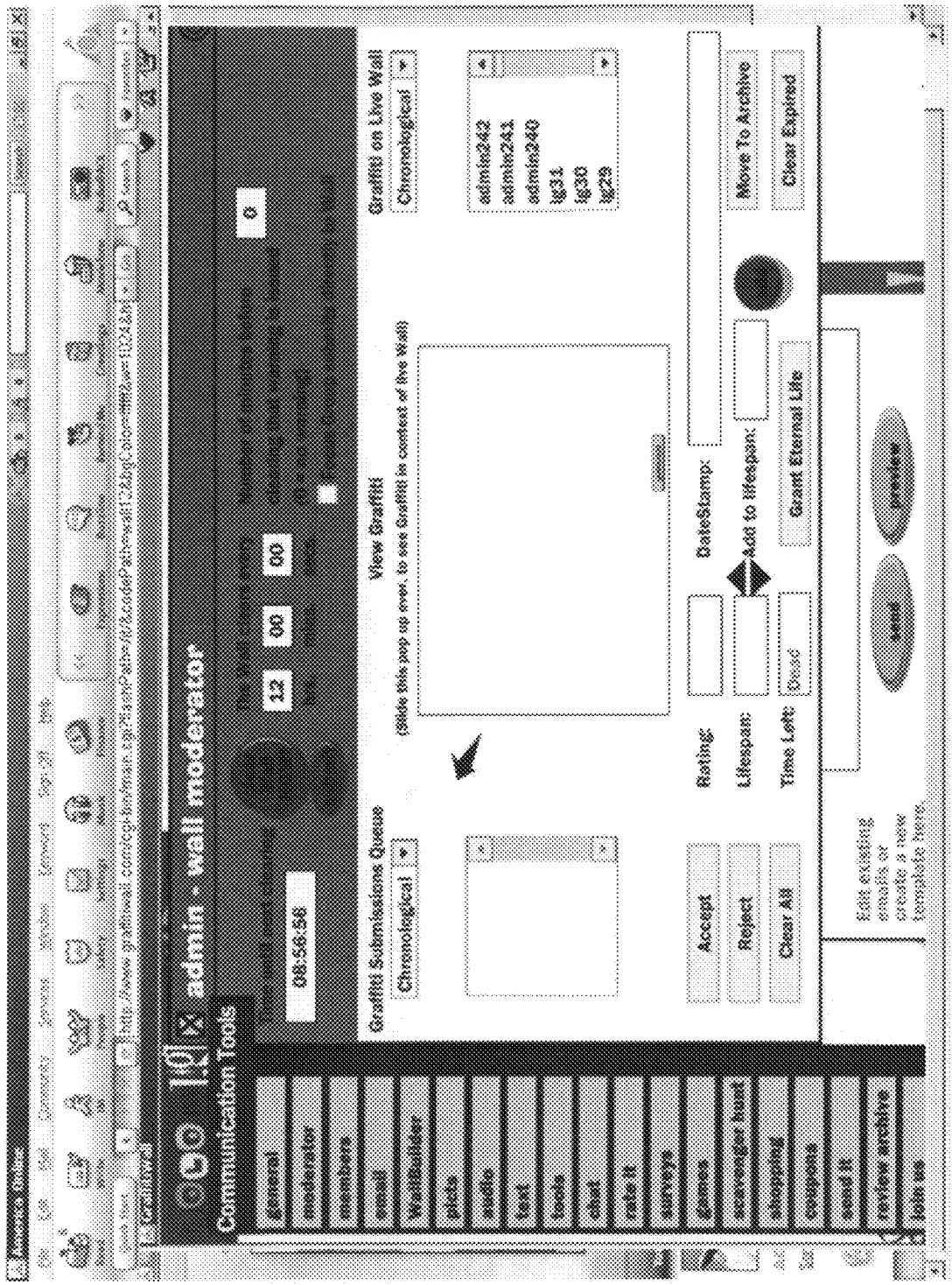
FIG. 28 is sample screen shot of the Wall Moderator Admin Tool.
Figure 29:
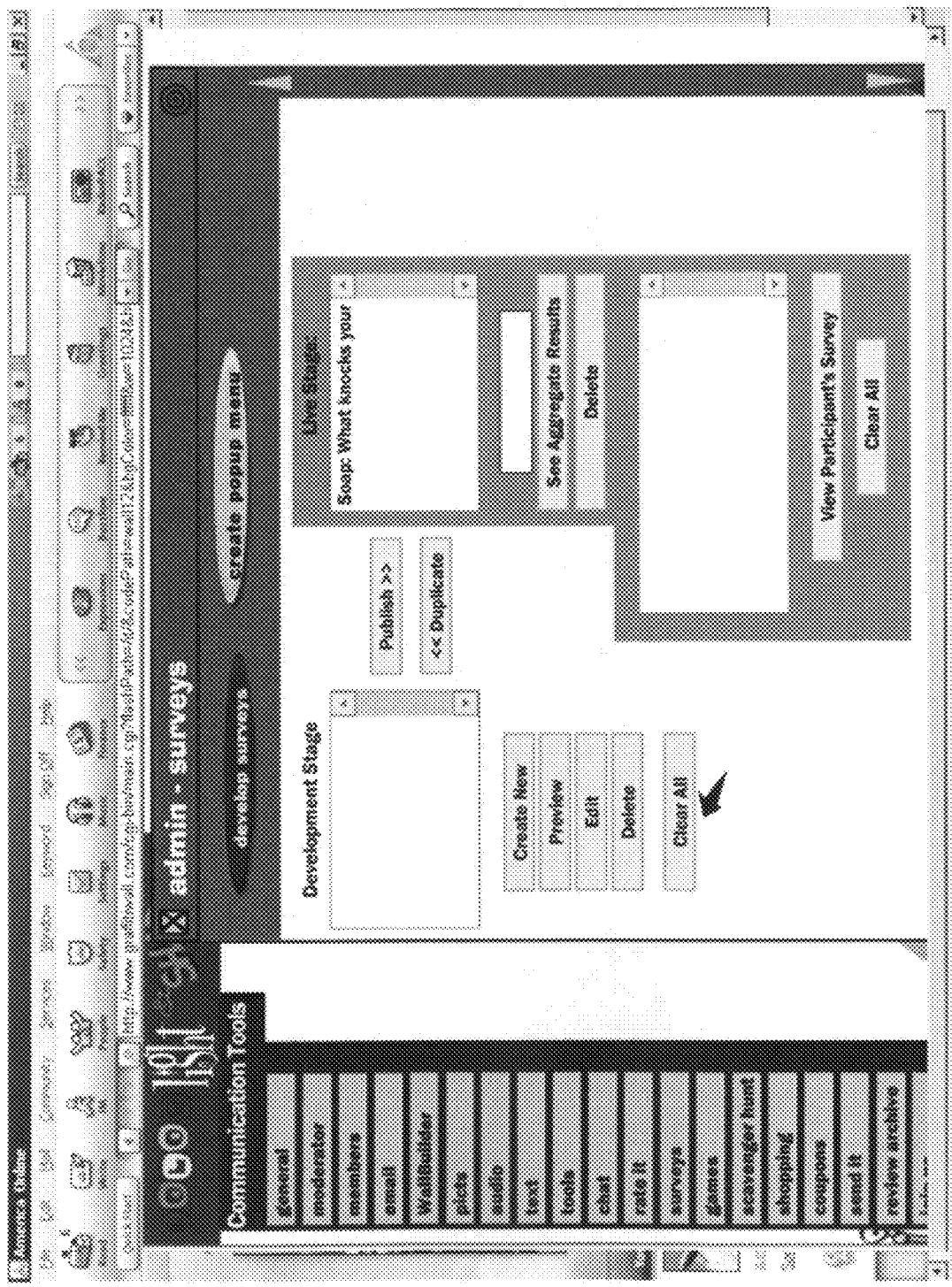
FIG. 29 is a sample screen shot of the Survey Admin Tool.
Figure 30:
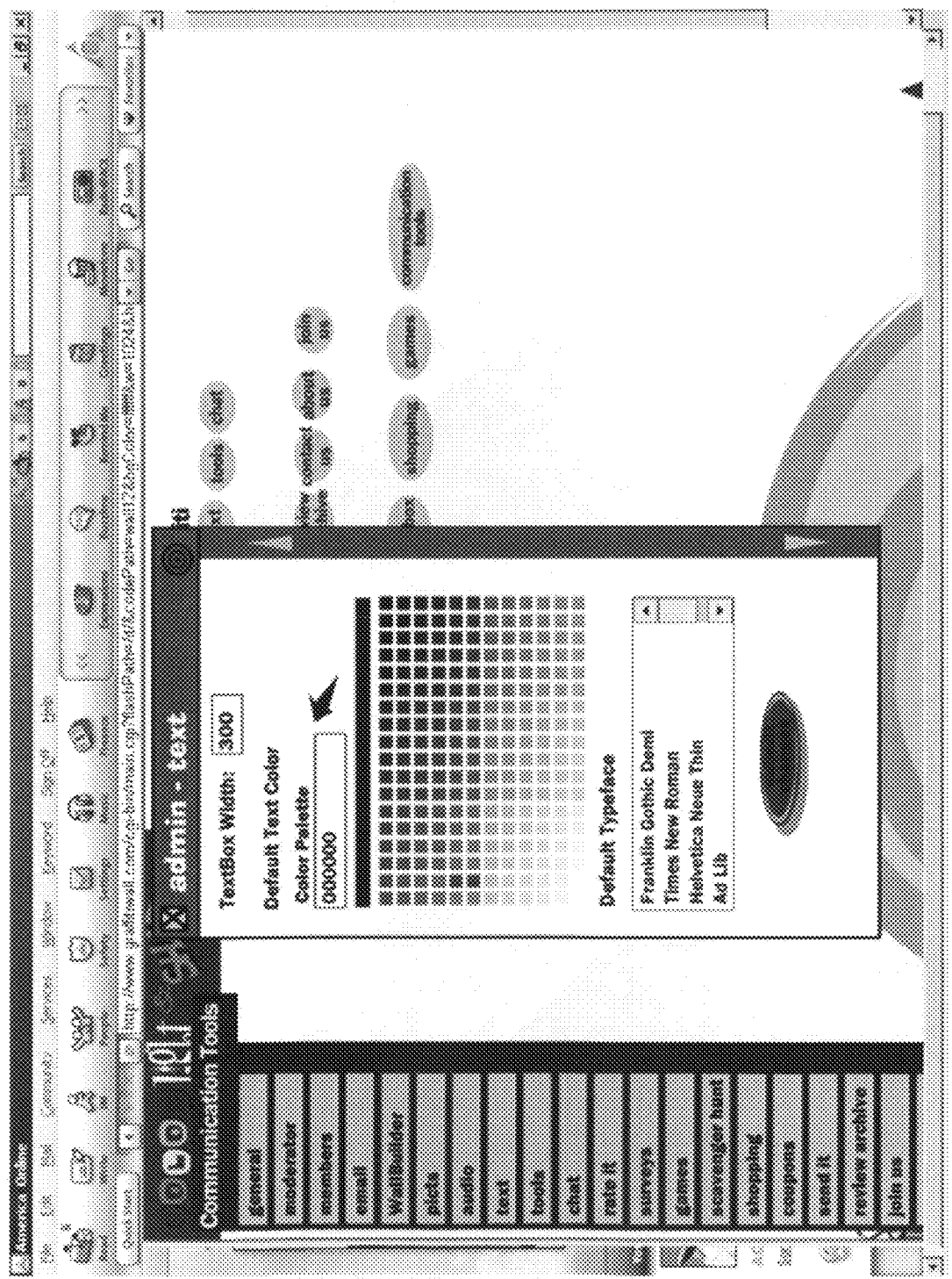
FIG. 30 is a sample screen shot of the Admin Text Tool.
Figure 31:
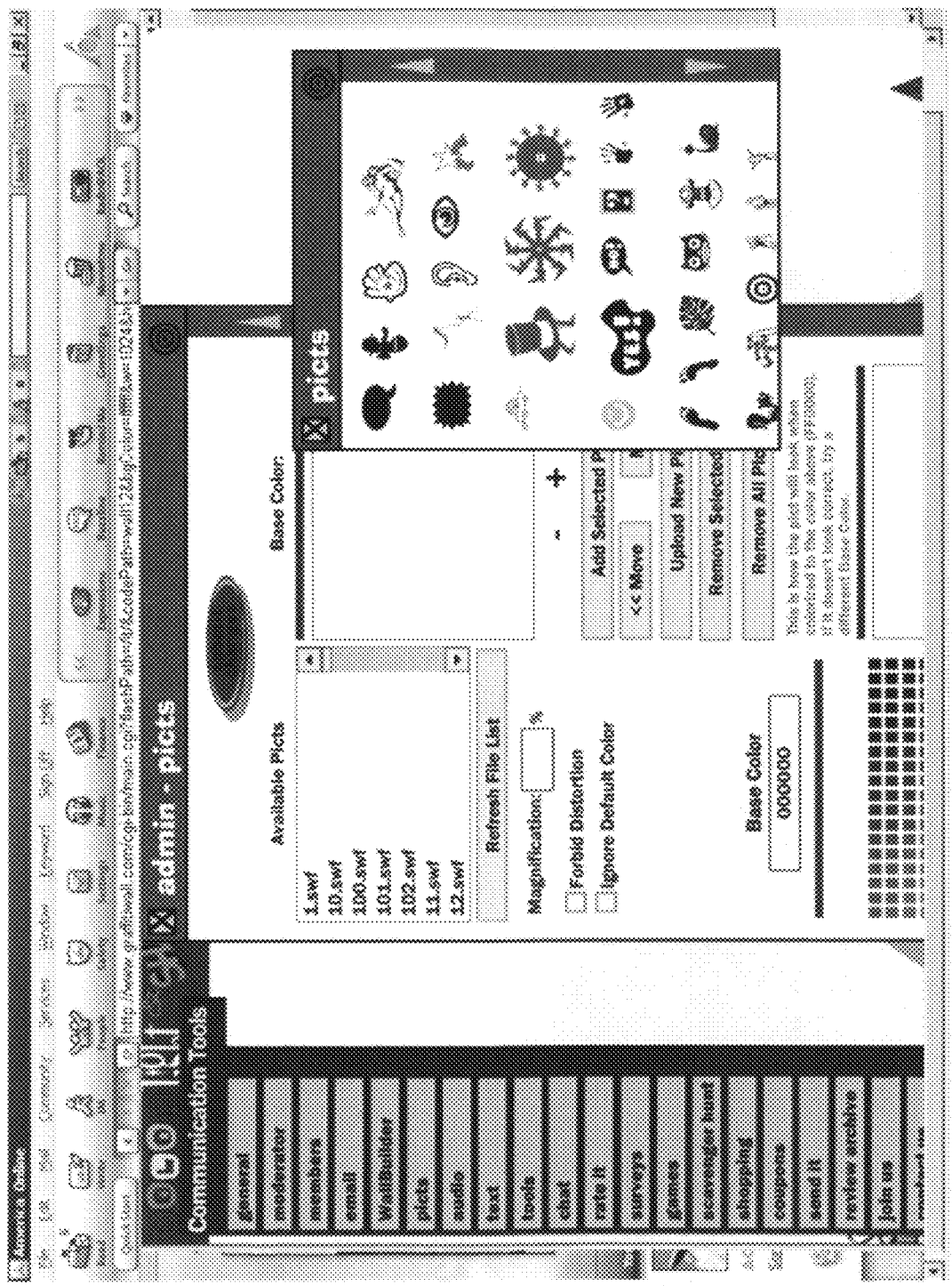
FIG. 31 is a sample screen shot of the Admin Picts Tool.

The ACP also provides for the creation and scheduling of focus groups FIG. 29 and the viewing of feedback data. Maintenance functions provided by the ACP include removal of undesirable consumers and undesirable Graffiti FIG. 7 reference numeral 625. FIG. 19 (the ACP's Member Admin Tool) and FIG. 28 (the ACP's Moderator Admin Tool) are additional mechanisms where the sponsor can adjust, control and understand member interaction on the Wall™. The ACP also provides for answering consumer questions and other real-time consumer support through chats FIG. 16 and email FIG. 25 or customized GraffitiWall™ communications via Send It's e-postcards FIG. 35. Options such as adjusting the size of the GraffitiWall™, which by default is larger than standard screen size, (e.g. 600×800, 1024×768 pixels), determining which images a consumer can manipulate FIG. 31, and setting the time period for which Graffiti will remain on the Wall before expiring are also controlled through the ACP FIG. 27. The ACP enables a sponsor to manage mailing lists of Wall users and to send email to all Wall members, or subsets of members, based on demographic criteria. The Email Admin Tool FIG. 25 enables the sponsor to create email templates FIG. 25 reference numeral 750 that can be used for: market research initiatives, communications from the CEO, Webmaster feedback, sales efforts, and training programs. Each template can be given a name for easy retrieval, ease of editing, and administrative purposes. Via email lists generated from the Member Admin Tool FIG. 19 reference numeral 727, a sponsor can target its communication to an individual or a select group.

The system provides a subset of the ACP, the Client Control Panel (CCP) 24 software, for each sponsor workstation 14. The CCP 24 software is designed for less expert users and provides less functionality. This software, GraffitiWall's Construction Kit, enables the sponsor to configure the GraffitiWall™ and to receive reports. Another subset of the system, GraffitiWallLite, provides only the Wall Builder tool FIG. 7 and the Create Graffiti Tools FIG. 8. The GraffitiWall™ is also available in an alternative form, the GraffitiWall Inside Out. This is an unmoderated, dynamic Wall™ owned by no one. Visitors can access the Admin Tools FIG. 6 so the global community can change the look feel, voice, and functionality of the Wall™ on a continual basis, depending on the visitors and the personality of the community.

Figure 20:
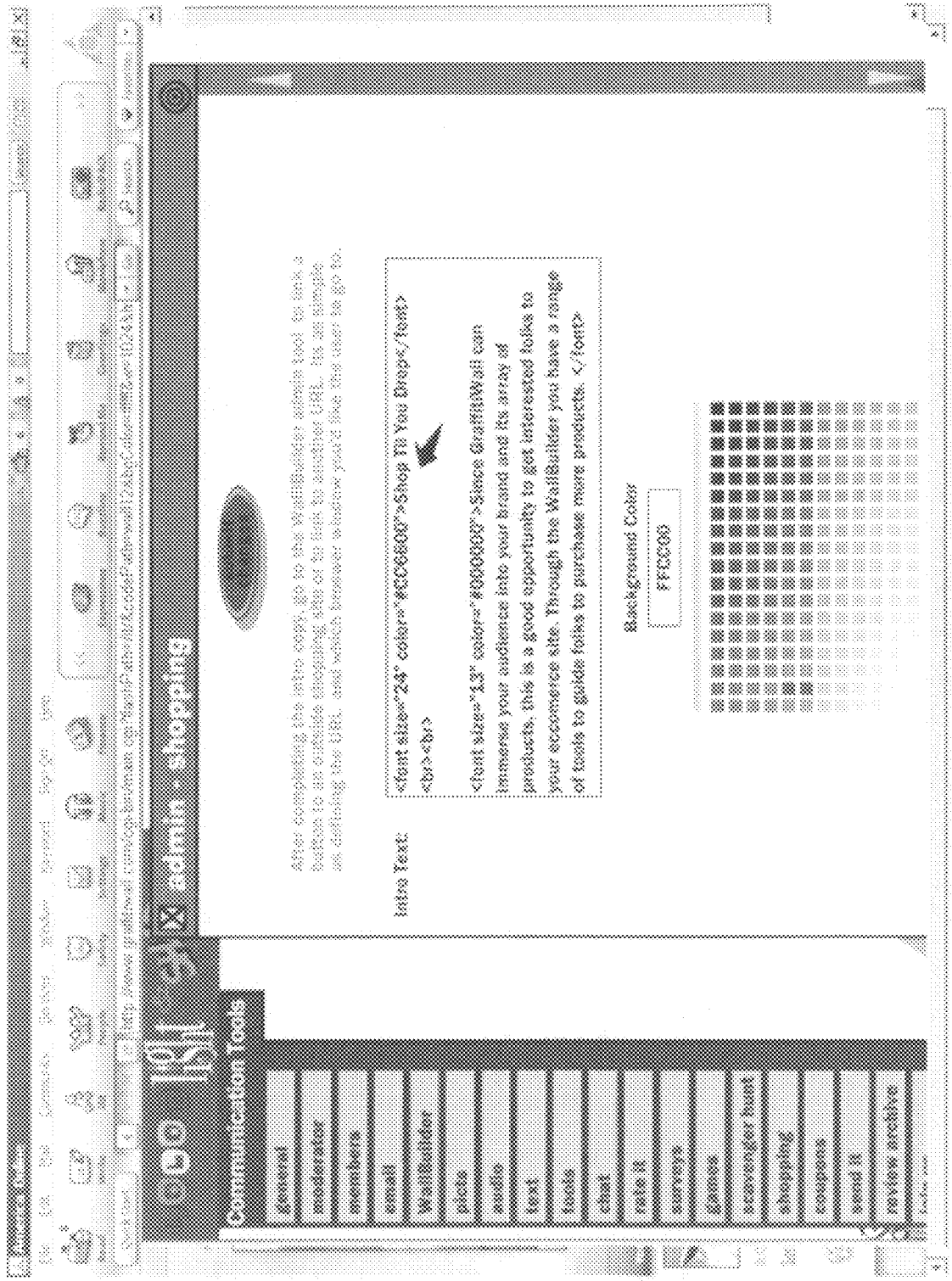
FIG. 20 is a sample screen shot of the Shopping Admin Tool.

A GraffitiWall™ can also be configured using the Admin Tools FIG. 6 to provide online shopping FIG. 6 reference numeral 625 and coupons FIG. 6 reference numeral 627. If a brand's product is placed on the GraffitiWall™, a consumer can purchase the item by clicking on it because the Admin Shopping Tool FIG. 20 establishes a link to the online store selling the item.

Members and visitors to the Wall™ can print out coupons redeemable online and at physical store locations. The Admin Tools FIG. 6 couponing template enables sponsors to determine the size, visuals, and copy of the coupon. In addition, the system generates unique ids and uses a variety of tracking techniques to minimize abuse of the coupons by unscrupulous consumers. The sponsor can track on both the macro and micro level, which members are taking advantage of the coupons via the Admin Members Screen Participation Info. FIG. 19 reference numeral 729. The sponsor can identify which individuals and demographic groups are using coupons to purchase products and when they are doing so. Because a GraffitiWall™ can be housed on PDAs, laptops, cell phones, or other networked devices FIG. 1 reference numeral 12, consumers can purchase products displayed on the wall from any physical location, as long as the consumer has either an online connection or is connected to a store's network.

A GraffitiWall™ can also be projected on to a real physical space, computer projection being well known in the art. The wall can be projected simultaneously in multiple locations, within a networked environment, facilitating collaboration among groups of individuals at remote locations. This will be especially advantageous for trade organizations, allowing individuals at remote locations to join a convention event, for example. Distance learning students will also benefit from this feature of the present invention because it allows one instructor to potentially teach students at multiple locations.

Yet another application of the present invention would enable consumers to manipulate a virtual furniture store GraffitiWall™ comprising a projected image of the consumer's living room for example, decorated with a store's furniture. The consumer can move the furniture around the virtual living room as a "test drive" of how the actual furniture would look in the consumer's home. Also, using well-known video game technology the user can manipulate the projected image through an attached miniature camera that translates body movements into screen movement or other such device. The GraffitiWall™ environment also provides consumers with the ability to maneuver from virtual room to virtual room, as is common in arcade computer games. This accomplished using techniques well known in the art (Appendix B), which create the illusion of 3-D space. Individual rooms can be restricted to specific consumers so that graffiti is not available to the global audience.

Figure 2:
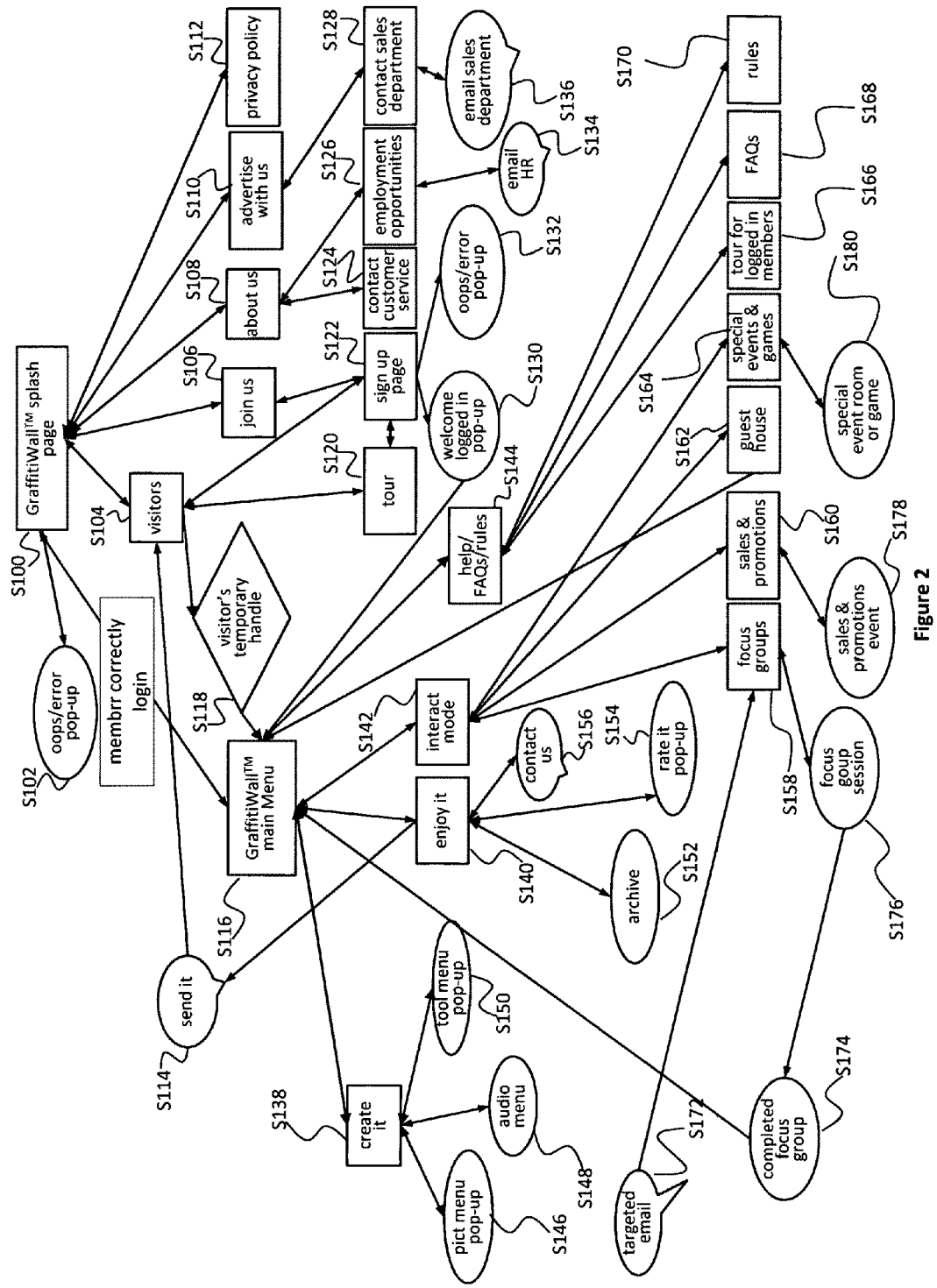
FIG. 2 is a flow diagram depicting the operation of the present invention.
Figure 9:
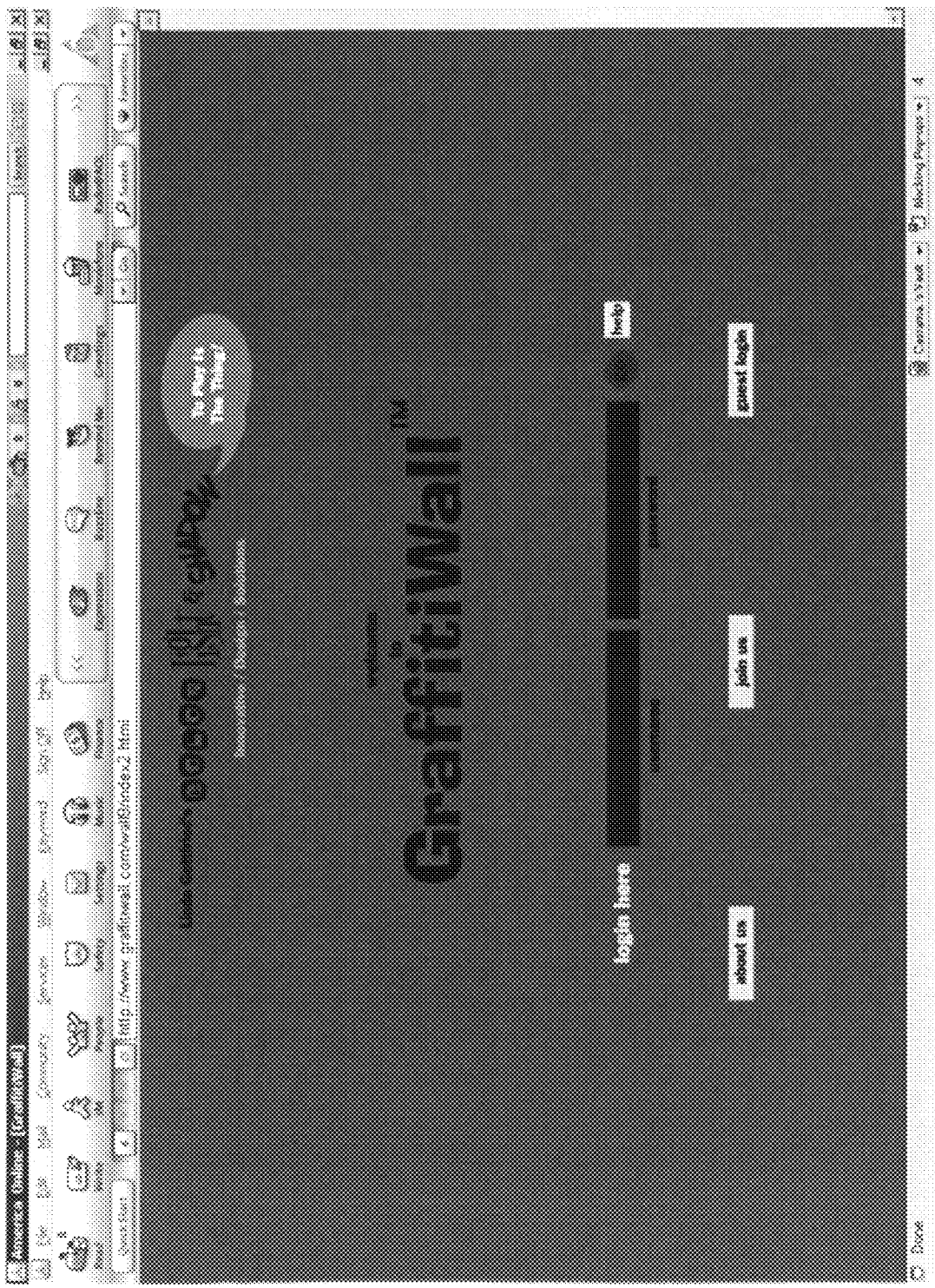
FIG. 9 is a sample screen shot of a Login Page for logging into the system.
Figure 10:
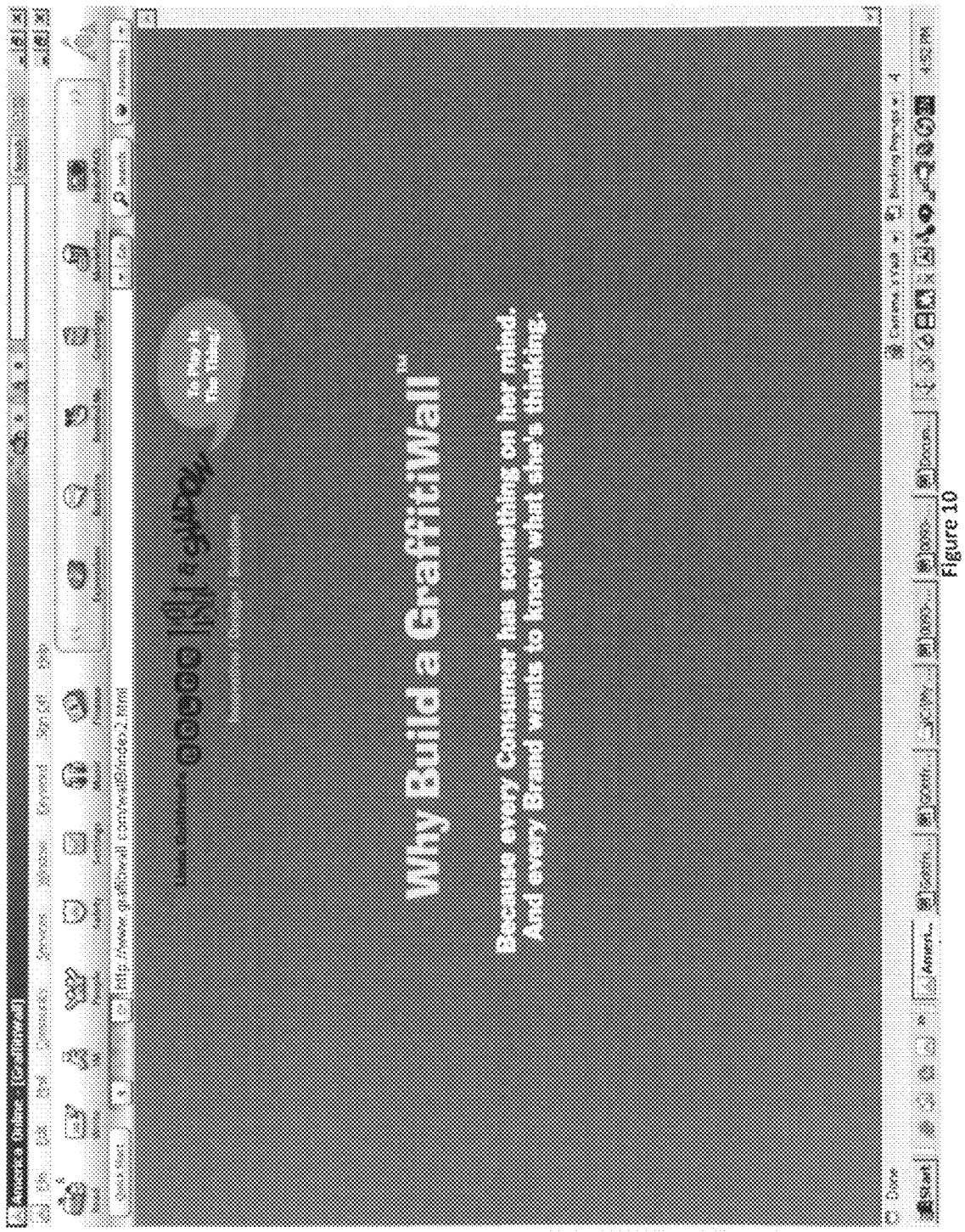
FIG. 10 is a sample Splash Screen shot.

FIG. 2 explains the step-by-step operation of the invention described above. In step S100, the consumer's browser displays a splash page FIG. 10, which welcomes the consumer to the GraffitiWall™. In Step S104, new visitors to the GraffitiWall™ can take an online tour of the GraffitiWall™ website. If the visiting consumer is interested in using the GraffitiWall™, the consumer proceeds to step S118 to obtain a temporary user name, (handle), and password (FIG. 9) and can then view the Graffiti Main Menu screen in step S116, shown in FIG. 8, which leads to the Create FIG. 8 reference numeral 400, Enjoy FIG. 8 reference numeral 440, and Interact FIG. 8 reference numeral 420 modes. A visitor handle only enables a consumer to create graffiti for a one-week trial period and the consumer cannot participate in focus groups, scavenger hunts, sales and promotions, and guest host programs.

Members of the GraffitiWall™ proceed directly to view the Graffiti Main Menu in step S116; membership is free. If there is a login error on the Login Screen FIG. 9, the member is presented with an error message in step S102. If the member's username is invalid, the consumer is directed to step 122 to sign up. If the password is invalid, the consumer is emailed a valid password. If the consumer does not enter a valid username and password within a preset time period, the consumer is directed to step 122 to sign up. A consumer can also proceed to step S106 to learn about the benefits of joining the Wall, using the About Us and Join Us Buttons on the Login Screen FIG. 9 reference numerals 450 and 452 and then onto step S122 to become a member of the GraffitiWall™.

Figure 11:
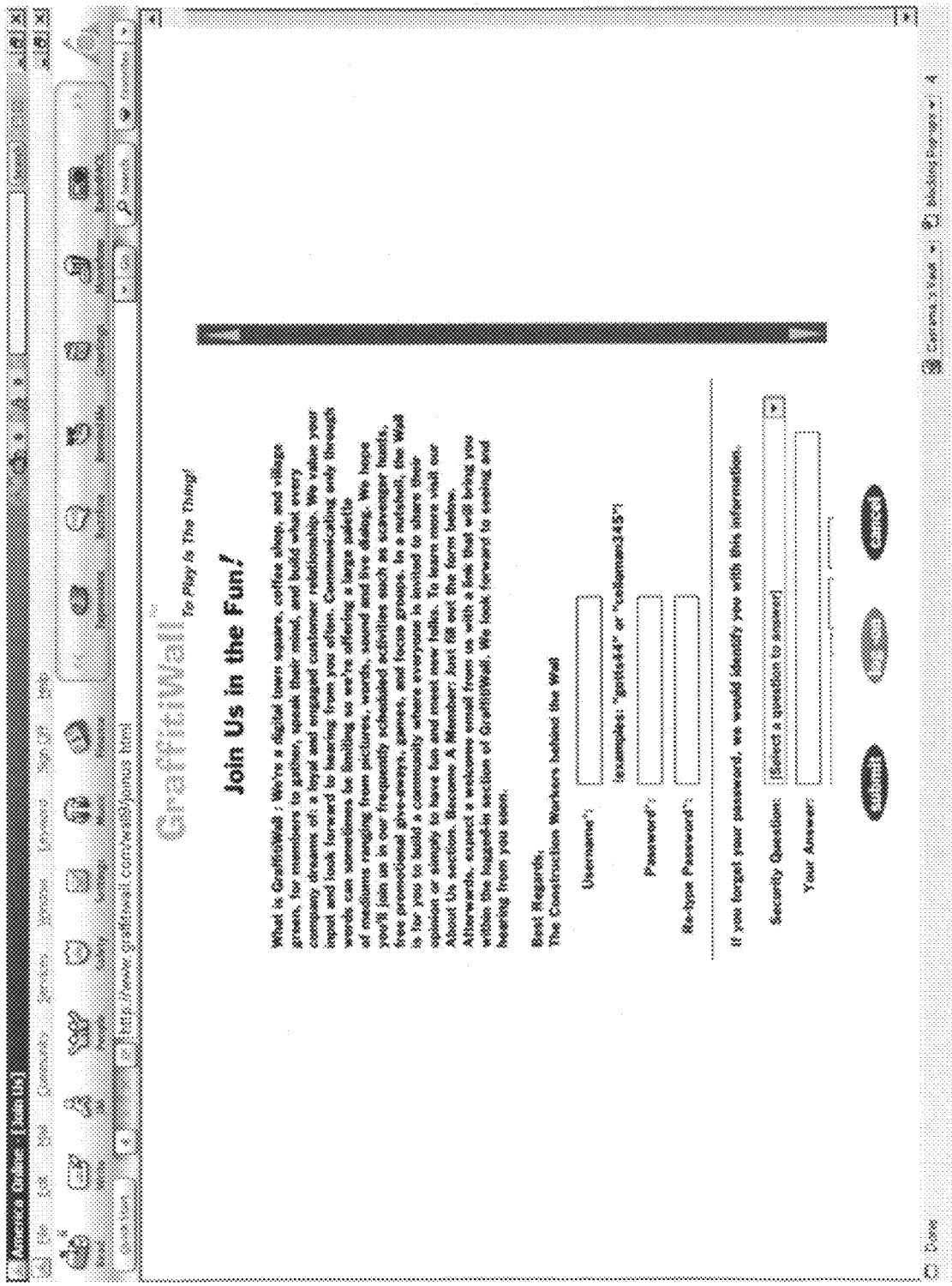
FIG. 11 is a sample screen shot showing a Join Up form for joining a Graffiti Wall and becoming a member.

The visitor can also go to step 106 and sign up for full membership using a Join Up screen shown in FIG. 11. The user would get a temporary handle and the system would send this member an email after completing a membership database search. This approach minimizes abuse, since some users may wish to sign up with multiple accounts. Before sending a confirmation email, the database compares each new member's information with a database containing current contact information, emails and names. If the comparison actuates a red flag, an email is sent, notifying the user of the result. When the search results are clean, a confirmation email is sent. The confirmation welcomes the new member and lists the member's username and password. Each user is instructed to link to the site by means of the hot link embedded within the email. Through this means, the user is brought into a logged in, new member area.

The consumer selects a user name and password and completes a demographic and general interest information form. If there are any errors in the signup procedure, the consumer receives an error message in step S132. The consumer's information is stored on the database server FIG. 1 reference numeral 10. After successful login, the user proceeds to step S130 to view a successful login pop up message and then proceeds to step S116, to view the GraffitiWall™ Main Menu FIG. 8.

The consumer may also proceed to step S108, from the splash page, to learn about the company providing the GraffitiWall™. In step S108, the consumer can review member benefits, partner benefits, information about staff and employment opportunities, receive customer service, and review a list of frequently asked questions (FAQs). In step S124 and step 126, the consumer can email, respectively, the customer service department or the human resources department of the GraffitiWall™ using the Contact Us Button FIG. 8 reference numeral 422 on the Main Menu Screen FIG. 8. The Contact Us Button FIG. 8 reference numeral 422 brings up a Contact Us form shown in FIG. 5. The form is used to retrieve valuable opt-in information for the sponsor as well as for potential partnering entities. Alternatively, the consumer may proceed to step S110 to review the advertising opportunities available on the GraffitiWall™ and to contact the GraffitiWall™ sales force, in step S136. The consumer may also proceed to step S112 to review the privacy policy.

Figure 8:
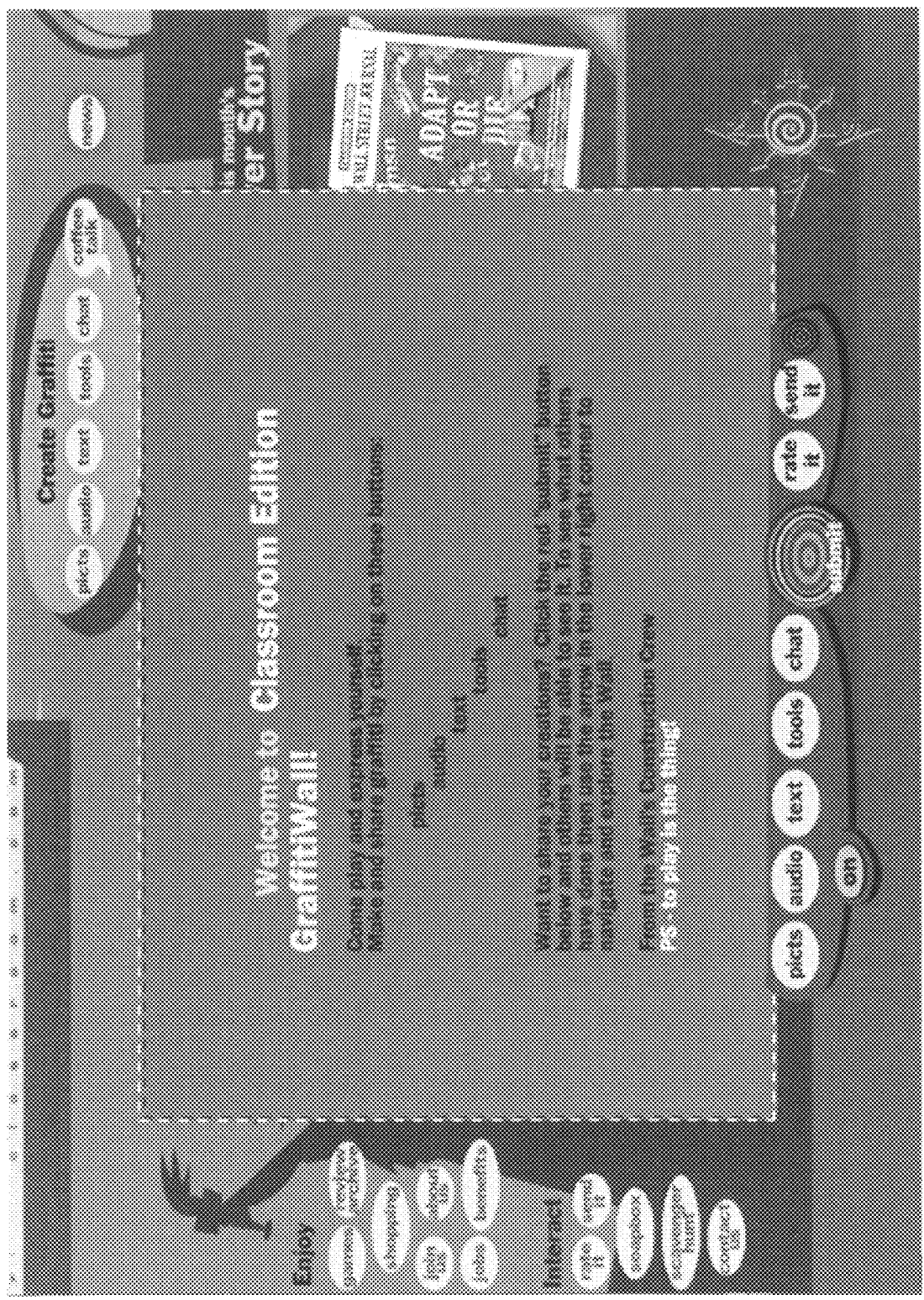
FIG. 8 is a sample screen shot showing the Main Menu Screen which leads to the Create, Enjoy, and Interact modes.
Figure 26:
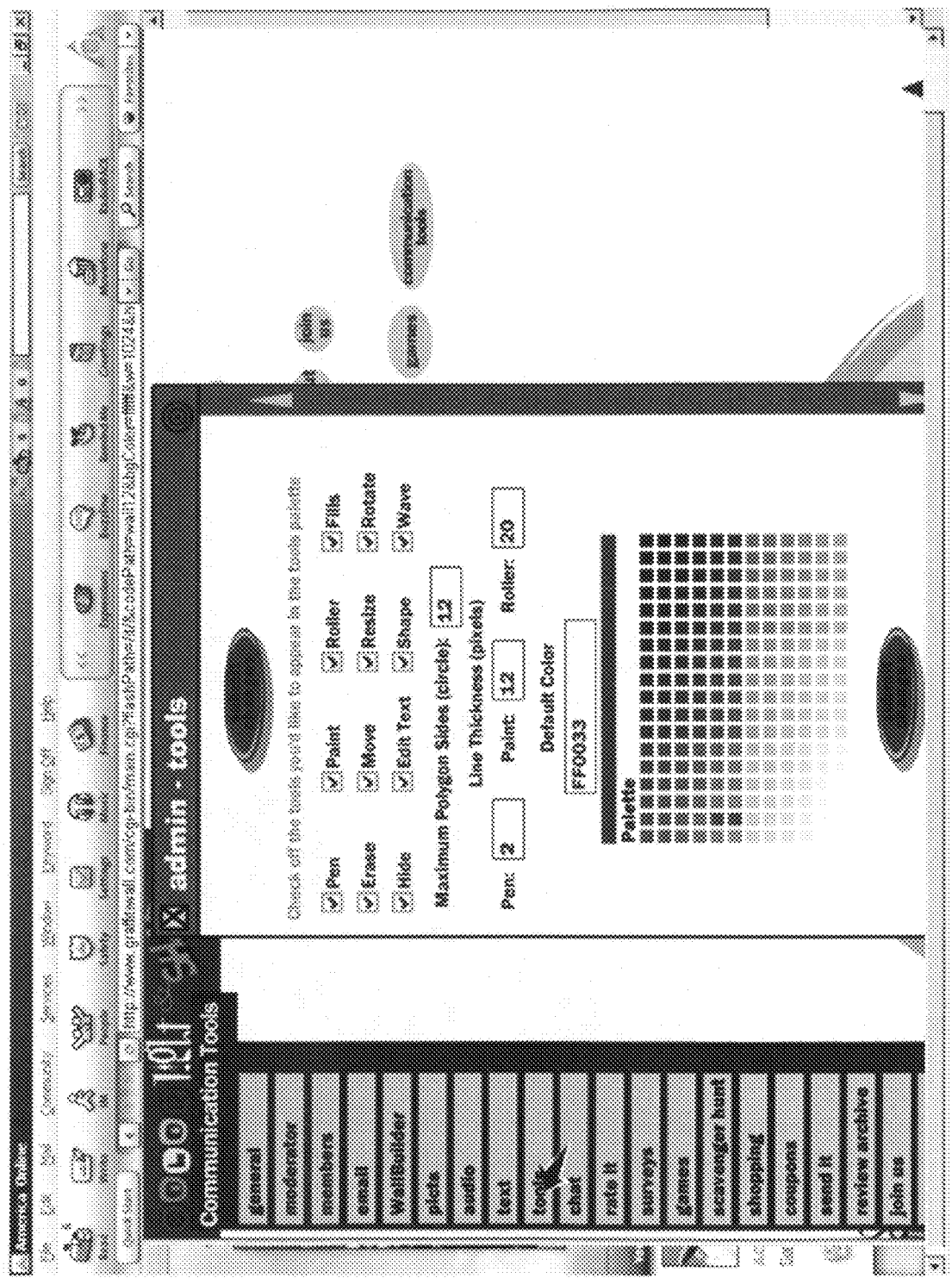
FIG. 26 is a sample screen shot of the Tools Admin Tool.

When the consumer reaches the GraffitiWall™ Main Menu FIG. 8, at step S116, a chat immediately becomes available. The consumer's handle appears in the chat window FIG. 12 and subsequently, on any graffiti the consumer creates. The consumer has a choice of proceeding to step S138, Create Mode FIG. 8 reference numeral 400, step S140, Rate Mode FIG. 8 reference numeral 410, step S142, Interact Mode FIG. 8 reference numeral 420, or step S144, Help Mode FIG. 9 reference numeral 454. Help Mode FIG. 9 reference numeral 454 brings up a Help Screen FIG. 13. In Create Mode, the consumer can select graphic media elements FIG. 3 reference numeral 100 in step S146 or audio media elements FIG. 14 reference numeral 650, in step S148 and drag these onto the GraffitiWall. The graphic media, besides including a standard selection of photographs and icons, also includes pictures of the sponsor's products. Using the Tools menu in step S150 FIG. 3 reference numeral 202, the consumer can modify and annotate the graphics and audio in any way the consumer desires and the company allows. The Tools Admin Tool FIG. 26 enables the sponsor to turn on or off the following tools: pen, paint, roller, (color) fills, erase, move, resize, rotate, hide, layering graffiti, edit text, shape (tool), and wave (tool). A sponsor can also use the Tools Admin Tool FIG. 26 to determine the maximum number of vertices for the shape tool, to determine the line thickness for the pen, paint and the roller, and to select a Wall™ default color.

For example, a sponsor can provide a bathing suit graphic picturing a new style of suit. The consumer can use the Tools to adjust the color, pattern, and shape of the bathing suit. The sponsor determines the type and degree of modification the consumer can effect. The consumer can also apply the bathing suit to a graphic of model, attach a musical riff to the dressed model, or even decorate an environment populated with the sponsor's products and logos.

As another example, a consumer can upload photographs of the consumer's house or garden. The consumer can then place the sponsor's products within the consumer's virtual home and limit entrance to the virtual home to specific members of the GraffitiWall™.

Figure 14:
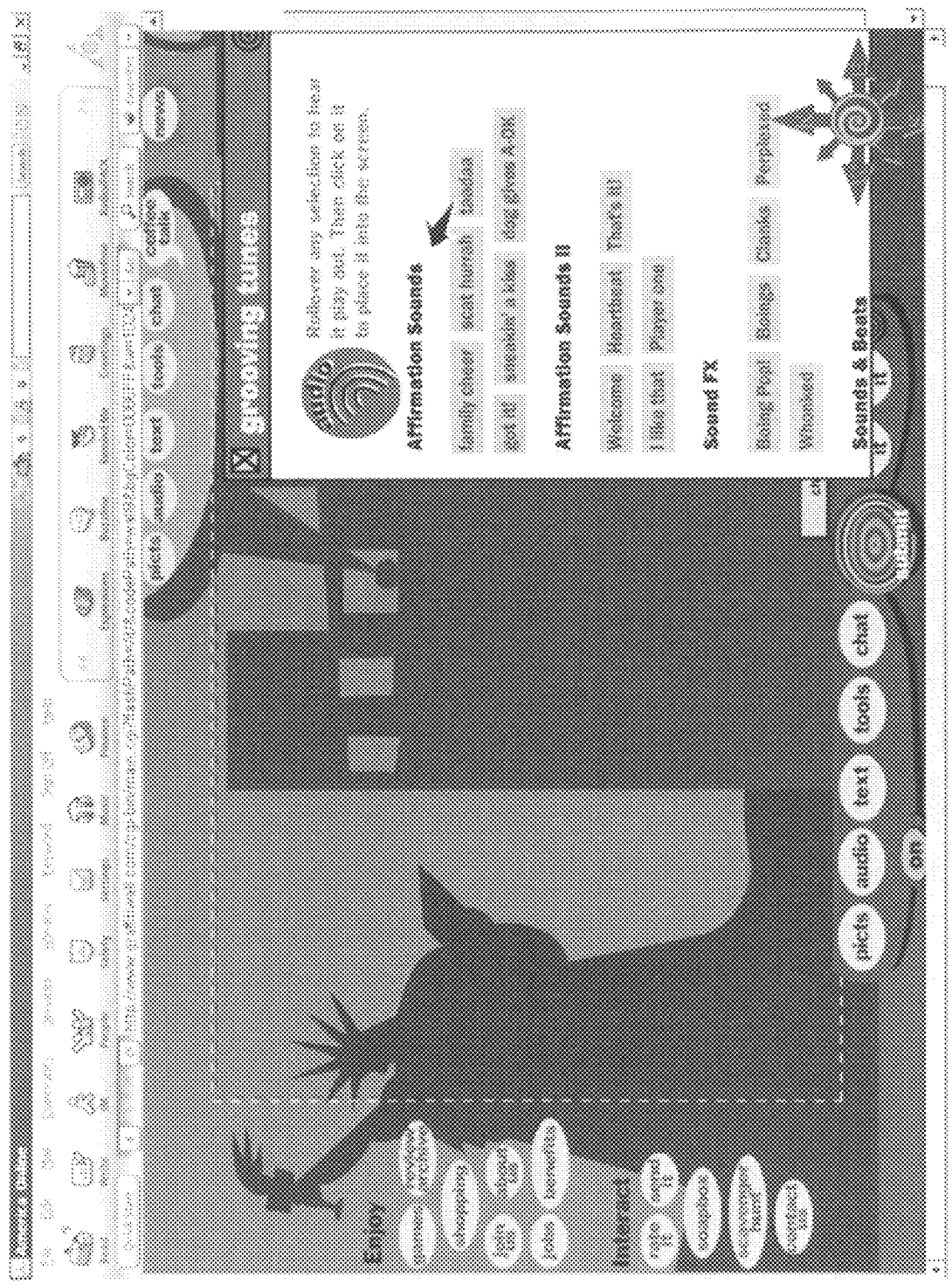
FIG. 14 is a sample Audio Screen shot for use by the consumer.
Figure 15:
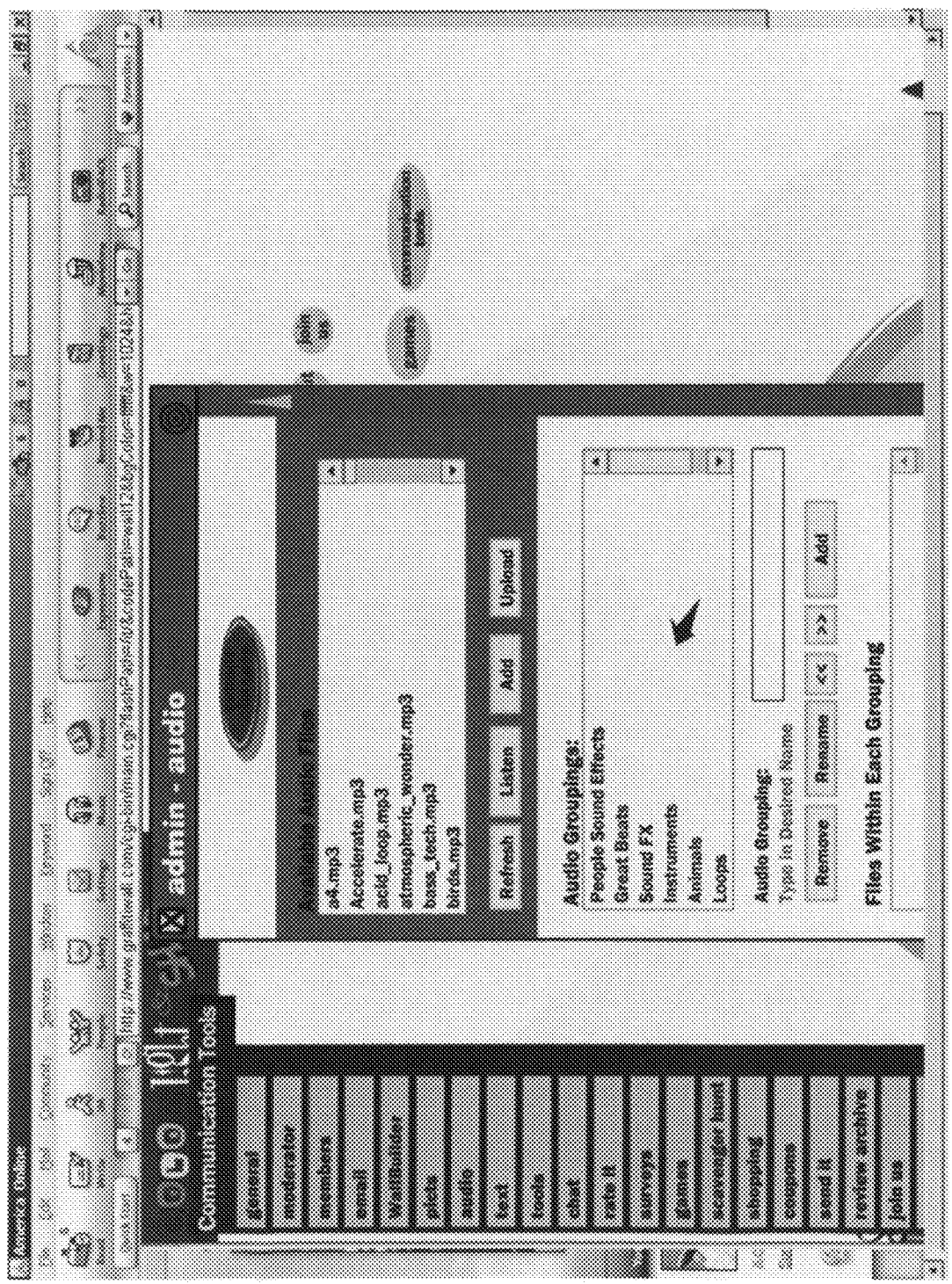
FIG. 15 is a sample screen shot of Audio Admin Tools.

The audio palette FIG. 14 reference numeral 650 contains streaming audio. Through the Audio Admin Tools FIG. 15 reference numeral 675 a sponsor can add or subtract audio MP3s of any type, including audio strings, commercial jingles, or an audio message from the sponsor's CEO, for example, to the consumer's audio palette FIG. 14 reference numeral 650. In one application, a music sponsor invites its members to create their own private rooms by uploading photos and sound clips to private Walls™. The members then invite other pre-selected Wall™ members to their private rooms for an online chat and to share and create graffiti.

The system provides the same capabilities for streaming video, as it does for audio, through a video palette. Using the Video Admin Tools, a sponsor can add or subtract various video clips to the consumer's video palette ranging from commercial fashion shows to a video message from the hosting sponsor's CEO. Additionally, consumers can upload their own videos to further personalize their GraffitiWall™ experience.

Figure 18:
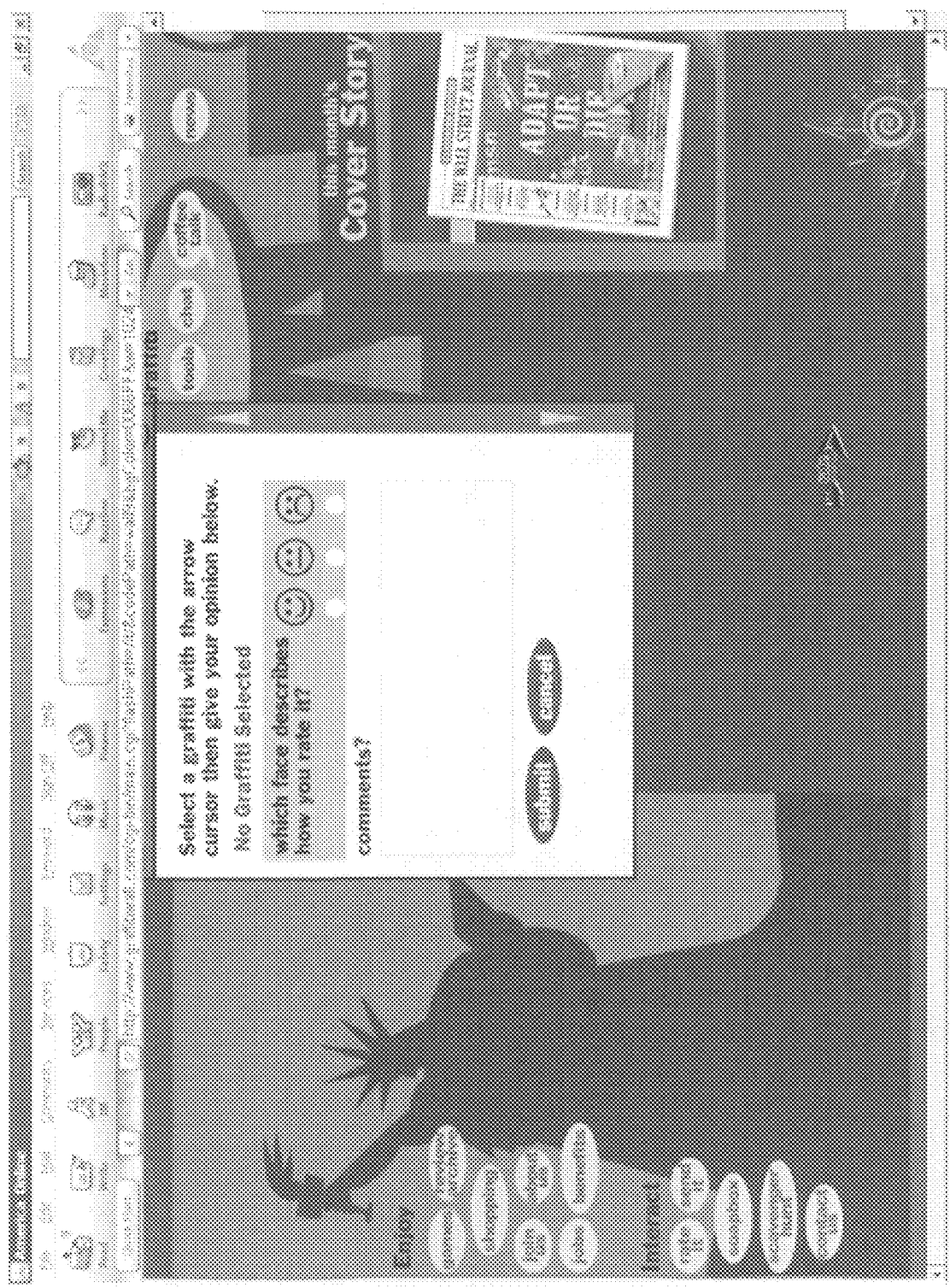
FIG. 18 is a sample screen shot of a Graffiti Rating Screen.

In Rate Mode, the consumer can proceed to step S154 and rate either the entire GraffitiWall™ or a particular area of the Wall. The consumer can rate graffiti, focus groups, chat sessions, online events and other features of the GraffitiWall™ FIG. 18. When a consumer rates a wall, the system takes a snapshot of the wall and records it, along with the consumer's vote, on the database server FIG. 1 reference numeral 10. Walls that receive high ratings are placed in the archive in step S152 so that members can view them.

Figure 24:
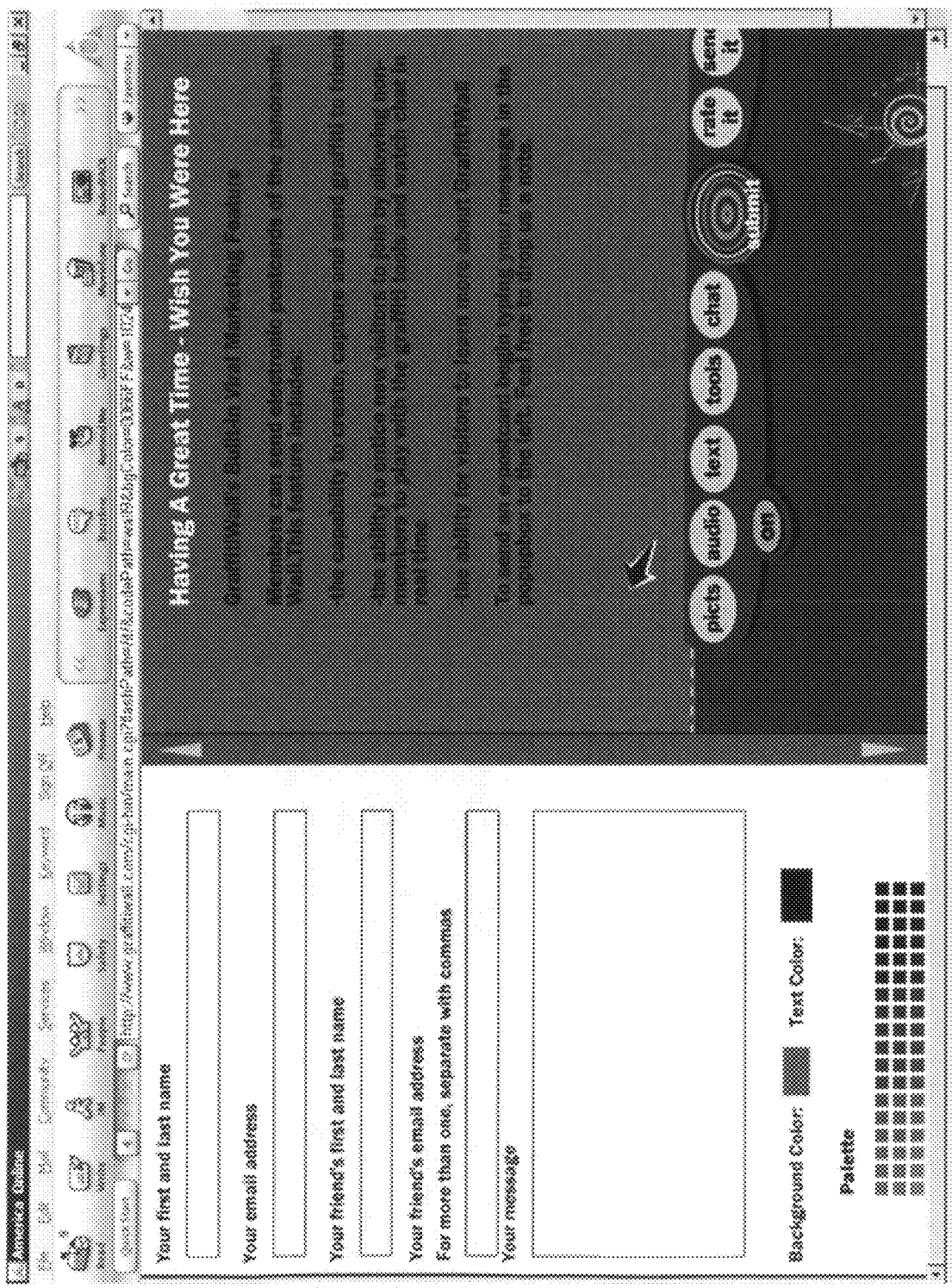
FIG. 24 is a sample screen shot of a Send screen for sending a GraffitiWall™.

In step S114, a consumer can email a scrollable snapshot of the wall along with a personal note. The consumer can determine the note's font and background color FIG. 24. The snapshot or e-postcard contains a unique Uniform Resource Locator (URL) where the recipient can view the GraffitiWall™ of interest. The emailed Wall™ is time-stamped with the time sent. A sponsor can send a Wall™ to a predefined and targeted audience by generating an email grouping via the Member's Admin Tool FIG. 19. The recipient can click on the URL to follow the link to the Wall and to play with the graffiti elements and watch any global chat taking place. If the recipient is not a member or is not logged onto the Wall™ and tries to submit graffiti, the Wall™ invites the visitor to either log in or join up and become a member of the GraffitiWall™ community.

In step S156, the consumer can contact the GraffitiWall™ sponsor via email FIG. 5. The email form provides a pull down menu, populated with topics the consumer can select from. This enables the system to route the emails by subject so the customer service department can respond more quickly. A text form enables members to contribute suggestions. If a suggestion is integrated into the GraffitiWall™, the suggester is rewarded with a coupon or promotional products and the suggester's handle is posted on the GraffitiWall™.

If the consumer proceeds to step S148, Interact Mode, the consumer can select from Focus Groups in step S158, Sales and Promotional Events in step S160, Guest Hosting in step S162, or Games, in step S164. Some focus groups are open to the full membership while others are only open to targeted groups or targeted individuals. The sponsor can reach a selected audience by emailing the potential participant a hyperlink to a logged-in area of the focus group session, or by placing an ad on the GraffitiWall™. The system can identify targeted members by matching the consumer's handle with the consumer's demographics, stored on the database server, shown at 10 in FIG. 1, and only displaying information about the focus groups to members with the desired characteristics.

Figure 21:
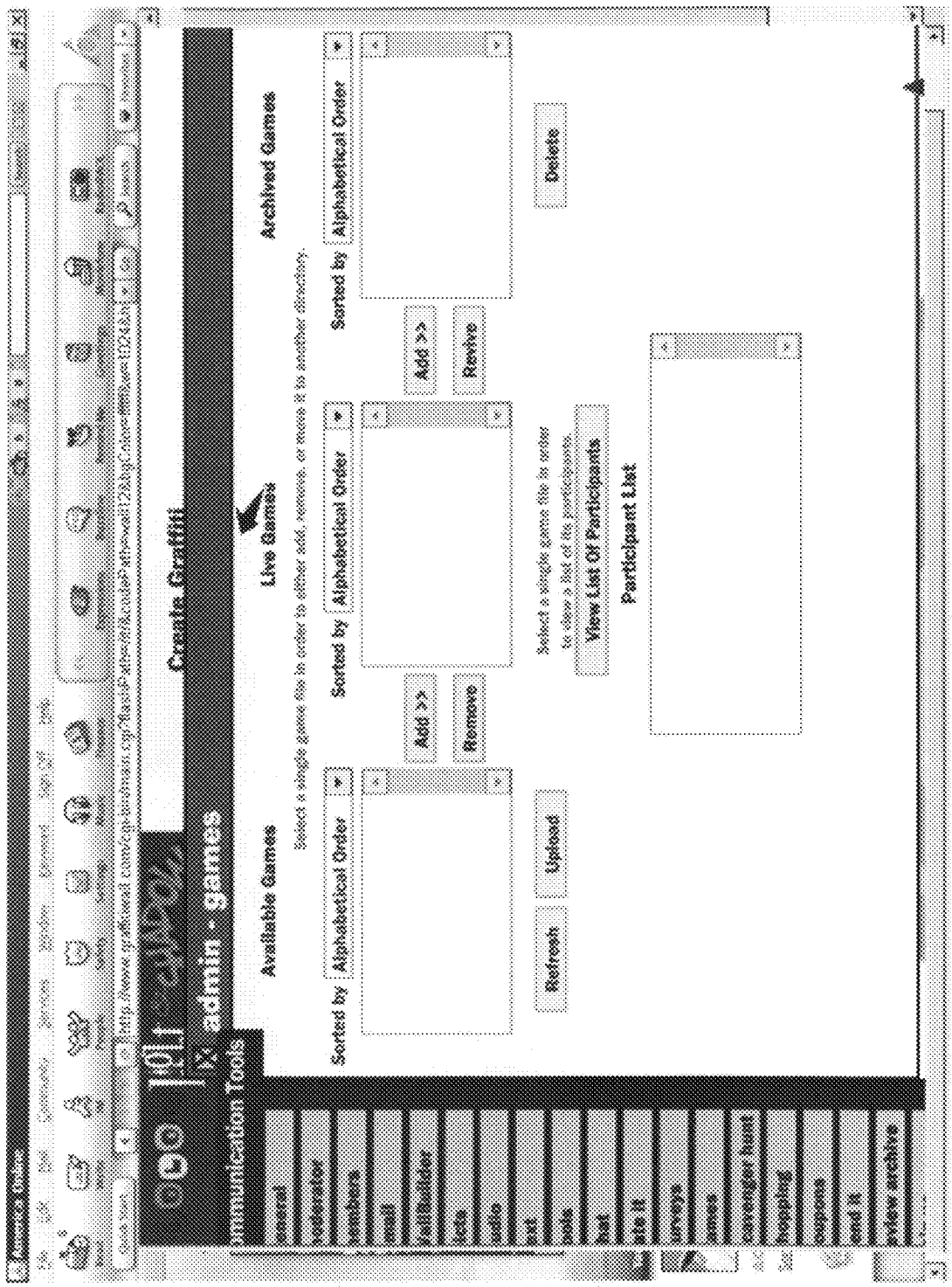
FIG. 21 is a sample screen shot of the Games Admin Tool.

Games can be integrated into the Wall™ and the sponsor can build an archive of games which can be posted live or retired from the Wall™ using the Games Admin Tool FIG. 21. In addition, a sponsor can search for the most popular game and identify which individuals played them and how often by using the Member Admin Tool FIG. 19 reference numeral 725 and selecting "games" as the Participation Type or by using the search mechanisms within the Games Admin Tool.

Figure 17:
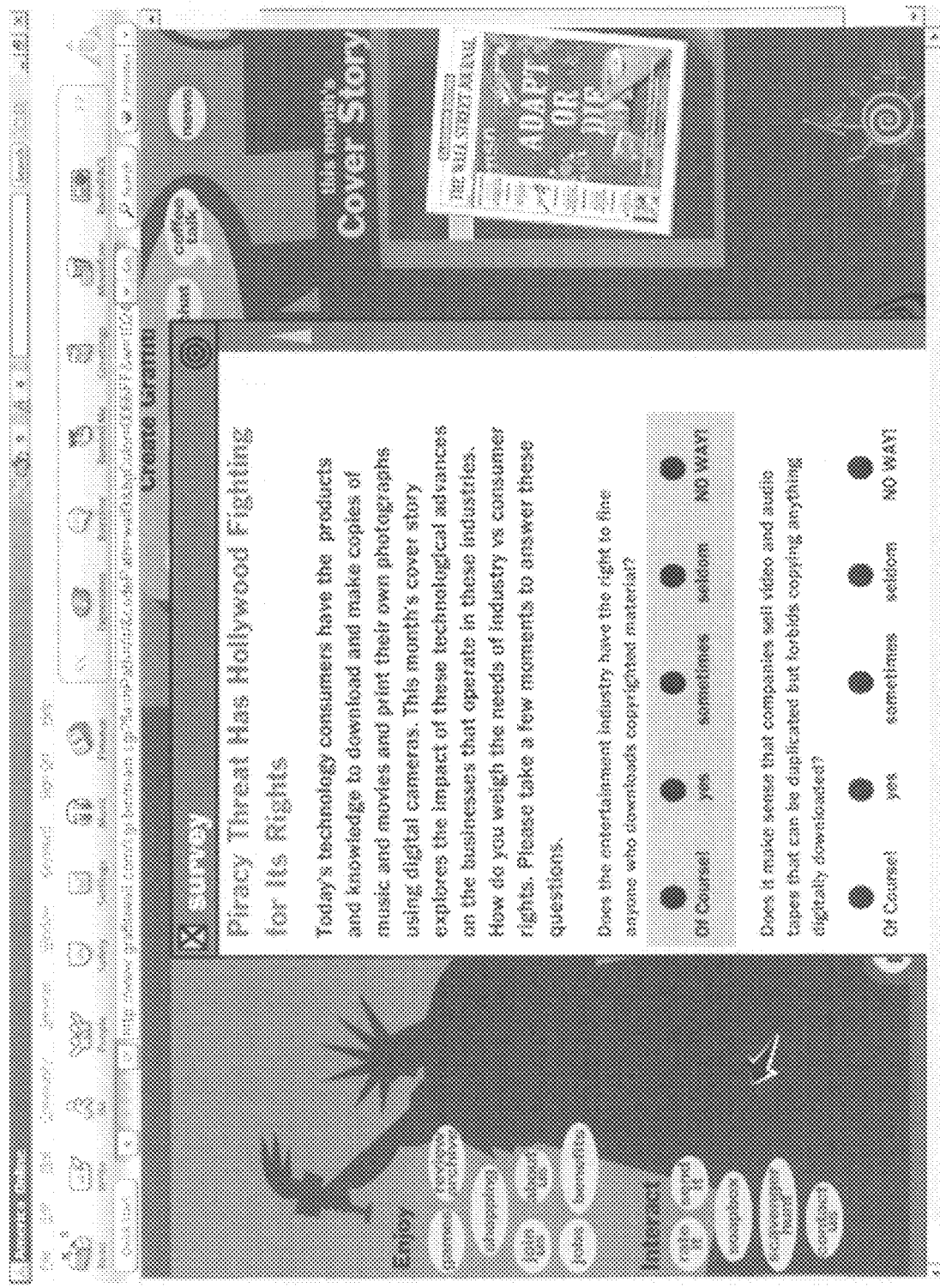
FIG. 17 is a sample screen shot of a Survey Screen enabling the consumer to participate in a survey.

If the consumer proceeds to step S158, Focus Groups, one means of receiving consumer feedback is by presenting the consumer with a sponsor-customizable multiple-choice questionnaire in the form of a pop up window FIG. 17. For example, the consumer may be asked whether the consumer regards a swimsuit as a fashion statement, lingerie, or a utilitarian article of clothing. The form must be completed in order for the consumer to proceed further. Subsequently, a series of pop up windows display product lines, packaging concepts, tag lines, print ads, televisions ads, radio ads, and the like. For example, the consumer may be presented with four different bathing suits and asked to select the one the consumer would purchase. The consumer can use a text box to add commentary explaining the consumer's choice. If the sponsor deems it appropriate to its research goals, consumers can have access to any of GraffitiWalls™ tools. For example, in the case of the bathing suits, consumers can modify its appearance via color, fabric, pattern, size, and accessories. They could select various popular songs to best describe their attitudes towards each swim suit being reviewed. The consumer can do these activities via the Walls™ Pict, Tools, Audio (FIG. 14) to name a few.

A focus group can be presented privately as a one-on-one endeavor, in which case each consumer can respond at his or her convenience, or as a real-time/live, group endeavor. Live focus groups are scheduled and the sponsor provides a moderator. The moderator moves the group along by providing a sequence of chat screens. The system saves the content of chat screens for later review by the sponsor. If a participant doesn't complete a session, an error message pop up directs the participant back to the session or to the GraffitiWall Main Menu™ FIG. 8. When a focus group session ends, participants receive a thank you and the aggregate results are displayed.

If the consumer proceeds to step S160, Sales and Promotions, the consumer can view information on new products and print out discount coupons or predefined sections of the Wall™. Sales and promotion events are publicized on the GraffitiWall™.

Figure 12:
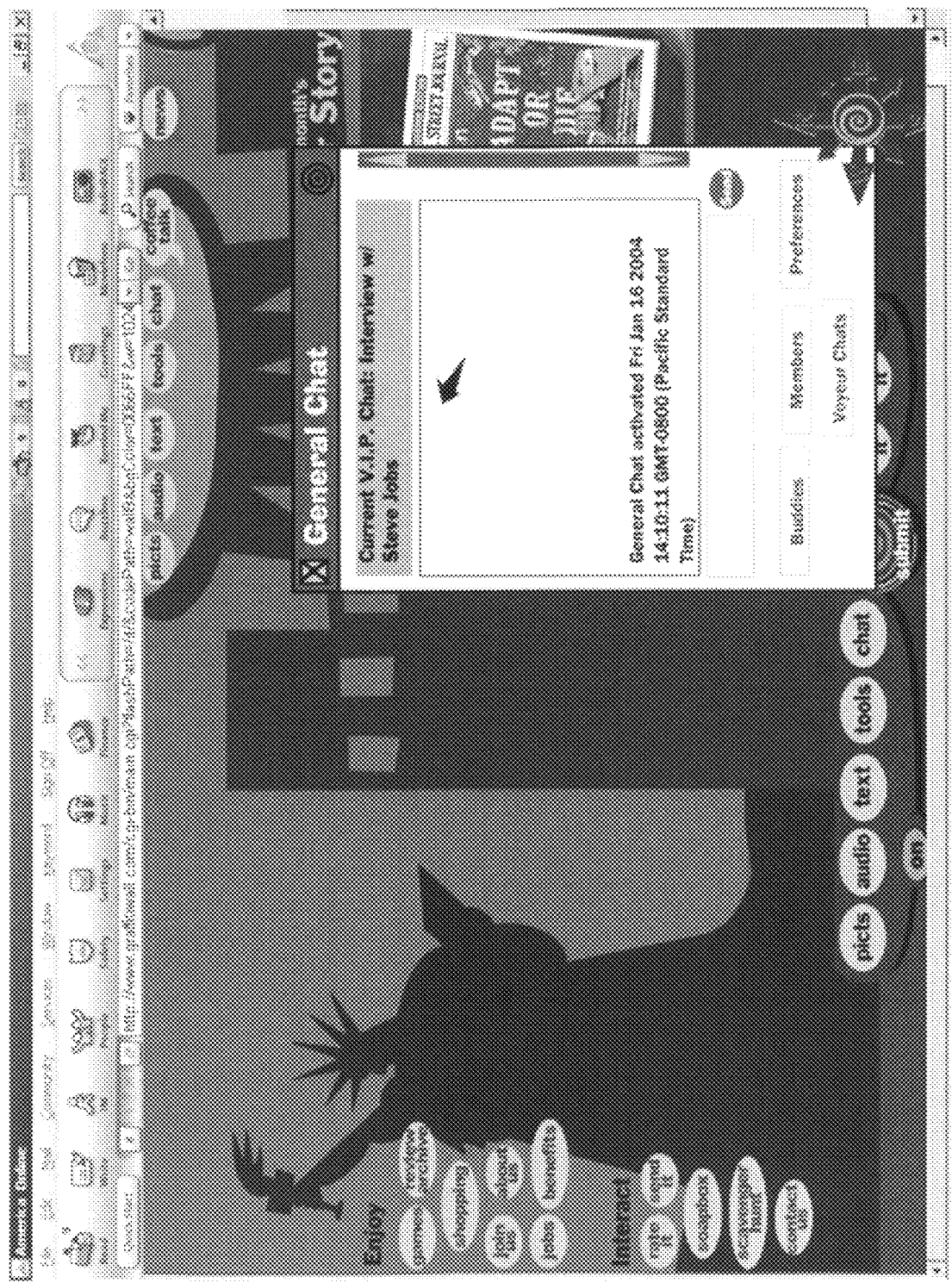
FIG. 12 is a sample Chat Screen shot for use by the consumer.
Figure 13:
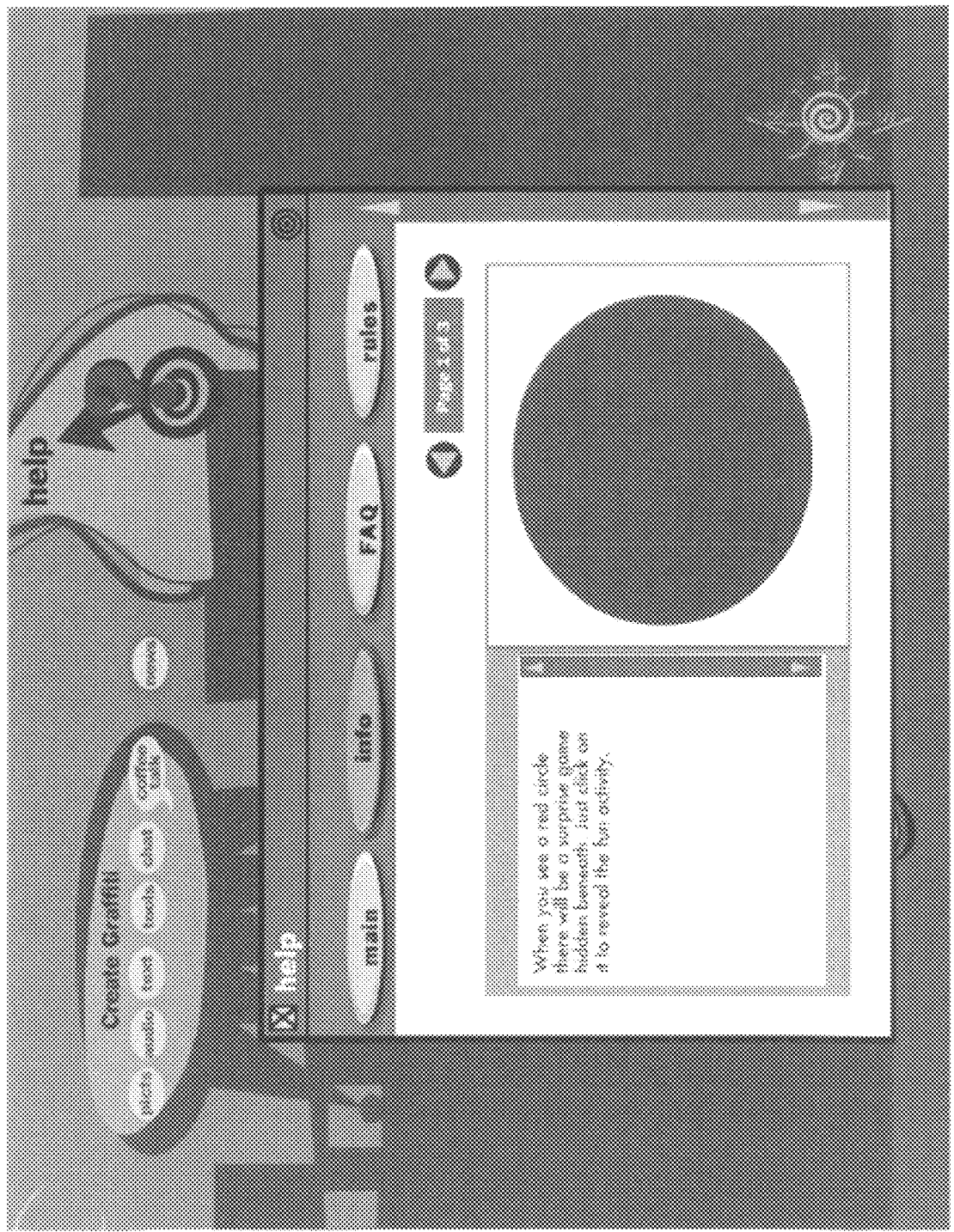
FIG. 13 is a sample Help Screen shot for use by the consumer.

If the consumer proceeds to step S162, Guest Hosts FIG. 12 reference numeral 500, the consumer can participate in a chat led by one or more prominent entertainers, models, or other well-known public figures. For example, a well-known super model could host a lingerie fashion show contest. Participants would use clip art of lingerie from a popular brand to dress a virtual model. A silent moderator would guide the chat's direction.

GraffitiWall™ users have the ability to create and edit a buddy list FIG. 12 reference numeral 502, the ability to create private chats with members of their own choosing FIG. 12 reference numeral 504, the ability to block selected members from targeting a private chat with them FIG. 12 reference numeral 506, and the ability to personalize a chat my assigning a distinctive color to each username and its respective chat input FIG. 12 reference numeral 506. In addition, private chatting areas can be created on a Wall™. A private chat area can have its own Uniform Resource Locator (URL) or be a dedicated area on the Wall™. Private chats can consist of, for example, a CEO advising his management team or a marketing director conducting a question and answer session with a targeted, pre-scheduled group of members. A private chat can also consist of a member creating a virtual party or living room only for invited guests.

Figure 16:
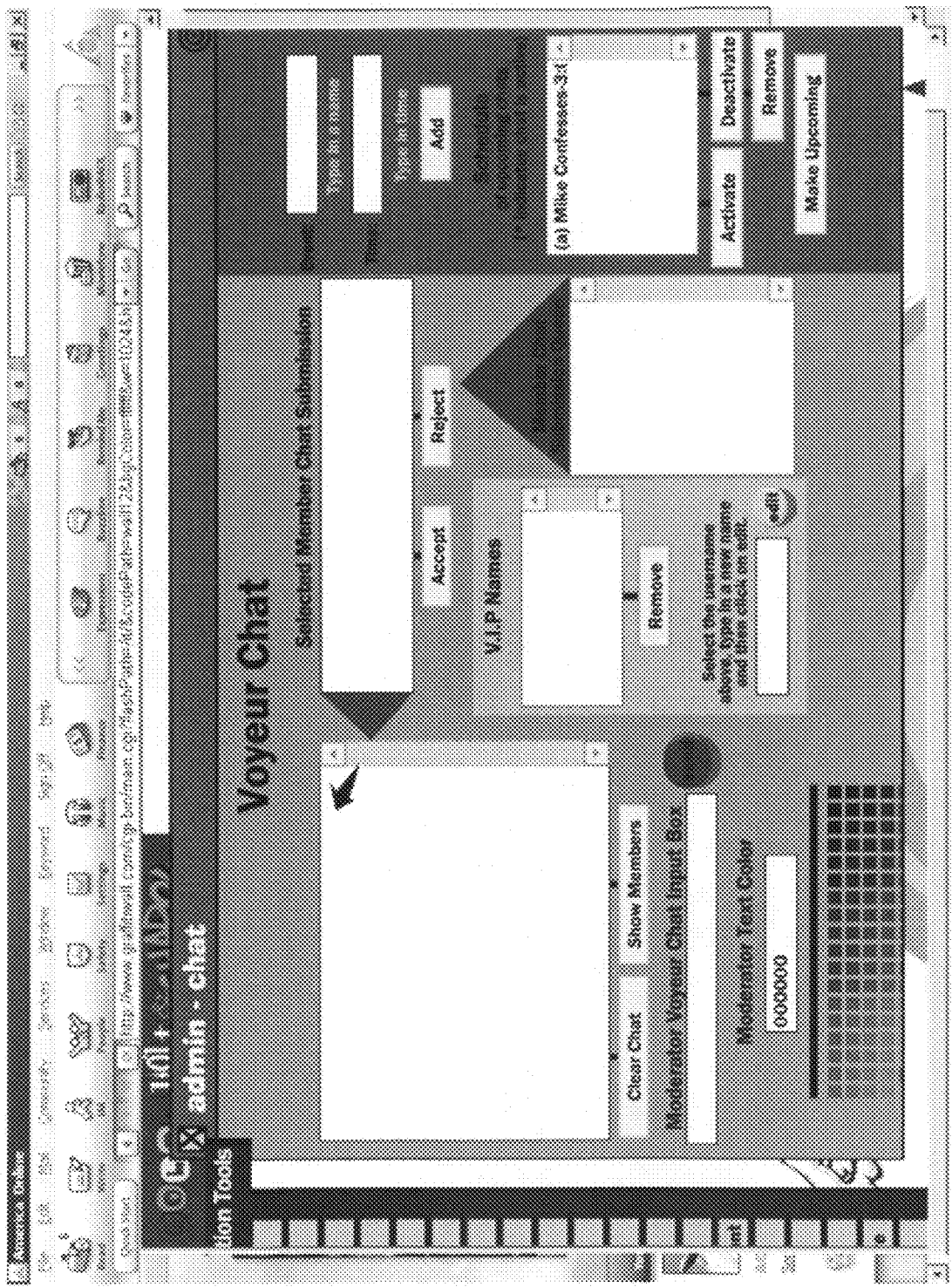
FIG. 16 is a sample screen shot of a Chat Admin Tool Screen for creating a Voyeur Chats and Private Chats.
Figure 22:
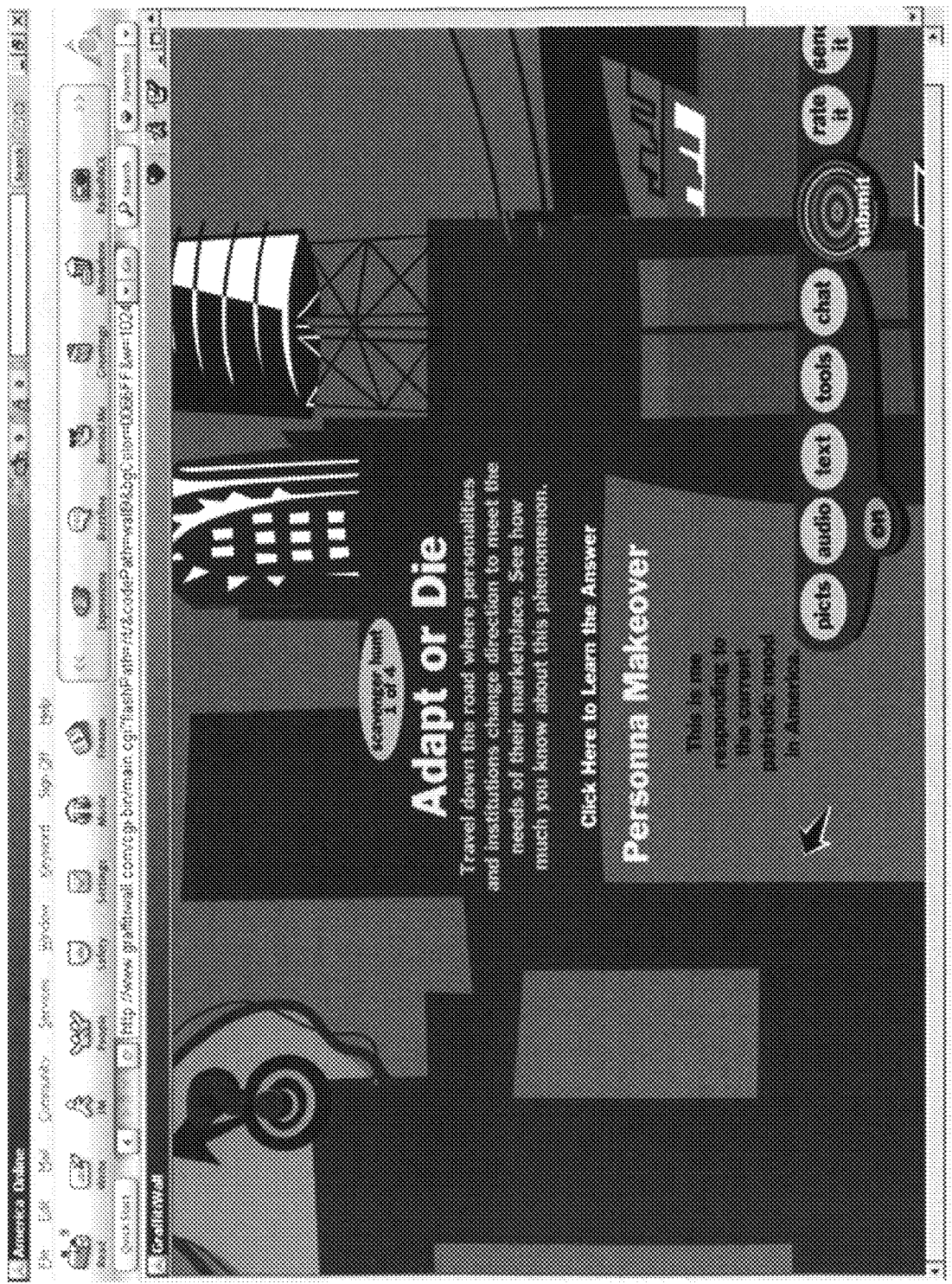
FIG. 22 is a sample screen shot of a first Scavenger Hunt Screen.
Figure 23:
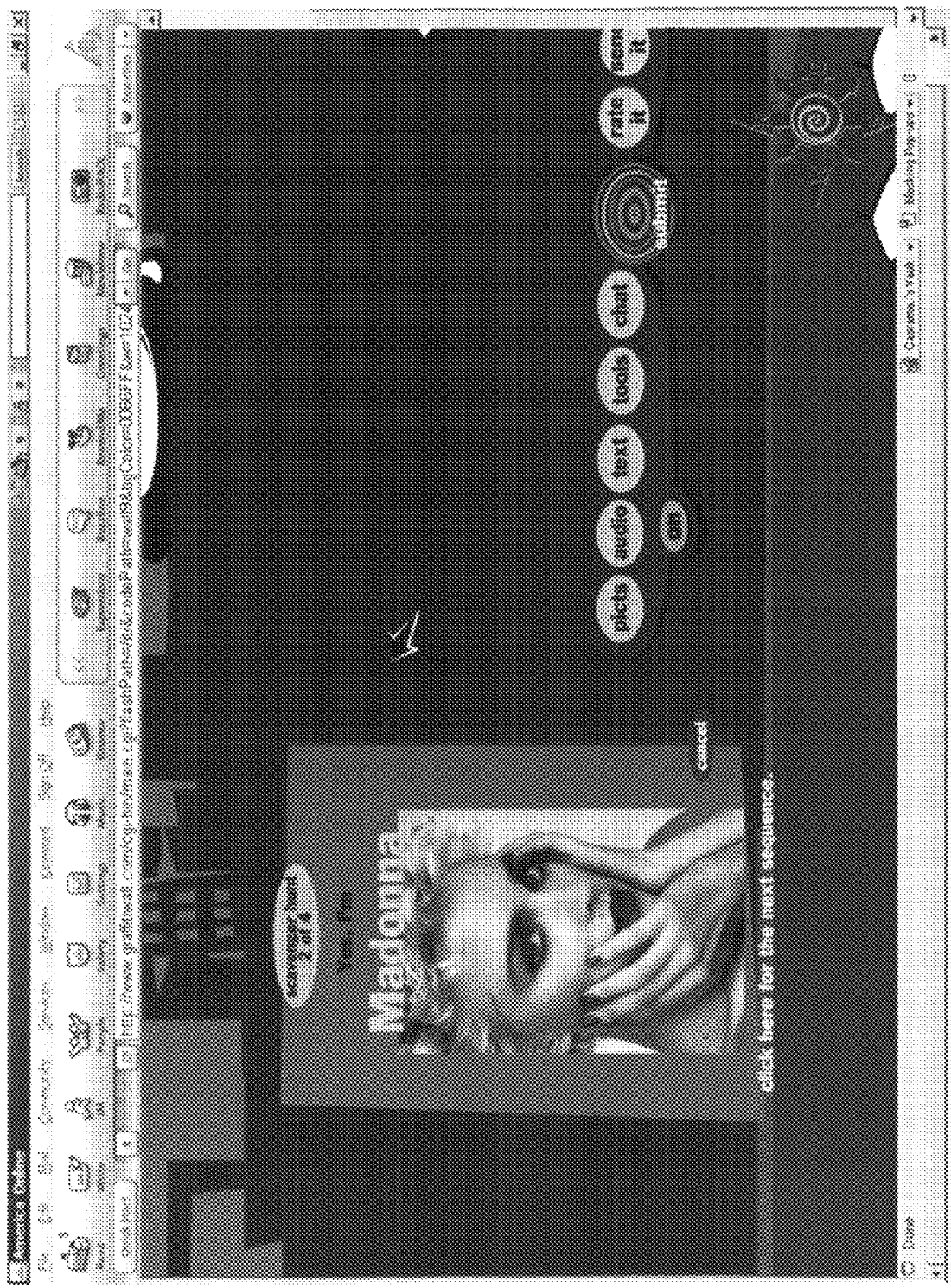
FIG. 23 is a sample screen short of a second Scavenger Hunt Screen.

A sponsor can also create a Voyeur Chat using the Chat Admin Tool FIG. 16. A Voyeur Chat enables a sponsor to run two different chats at the same time. The first chat is a private one, for example, a discussion between Robert de Niro and Billy Crystal, which is not open to the general public. The second or global chat is open to everyone and its purpose is to provide the global community with an opportunity to comment upon the private chat and to share their observations with other "voyeurs" observing the private chat. Participants in the global chat can submit a question or comment to a moderator who determines whether or not to forward it to the private chat participants using the Accept Button FIG. 16 reference numeral 700. Unless the question or comment becomes part of the private chat, it is not revealed to anyone but the moderator. Since the various GraffitiWall™ tools can be used concurrently while the Voyeur Chat is taking place, participants can take a survey FIG. 17, draw a picture FIG. 3 reference numeral 200, edit a sound FIG. 14 reference numeral 650 or re-arrange moveable elements FIG. 3 reference numeral 202 on the Wall™. The chat participants activities are recorded and archived for later review and analysis Step S152, FIG. 4. sponsor. The Scavenger Hunt FIG. 22, FIG. 23 is a simple and powerful function giving sponsors a fun mechanism for encouraging members to participate in a sequence of events. In a Scavenger Hunt, hidden events or multimedia elements are hidden throughout the Wall™ and only appear after the consumer initiates a predetermined action. For example, the consumer responds to a headline at a first x,y location by clicking on it (event one) and then the consumer's cursor jumps to a second x,y location on the Wall™ where a game becomes visible (event two). When the consumer completes the game, a coupon and promotional copy becomes visible (event three).

Scavenger Hunt events can consist of videos, coupons, audio clips, text messages, and sound bytes, for example. An event can transport a consumer to another section of a Wall™, to another URL within the same browser window, or to another URL within a second browser window. Scavenger Hunts are used to tell a story, teach a concept, build a case, sell a promotion, or test a product, for example. Scavenger Hunts encourage members to use the GraffitiWall™ tools throughout the Scavenger Hunt or during a predetermined sequence during a hunt. So, for example, during the hunt, the member can take a survey, draw a picture, edit a sound, reassemble moveable elements on the Wall™, or participate in a live chat. Member behavior during the hunt is recorded and archived for later review and use.

In step S180, the consumer may move to a virtual "room," (hyperlink), to participate in an activity, when more than one game or event is simultaneously featured.

In step S166, logged in members can experience an online tour, learning the best features of the GraffitiWall™ and how to take advantage of them. In step S168, members can review a list of FAQs developed from chats and emails. In step S170, member rules of behavior are listed, together with the penalties for breaking them.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An interactive network for display of product information to a plurality of consumers, comprising:
   a. a multimedia forum for enabling a consumer to communicate with other consumers and at least one sponsor for advertising a product according to the product information;
   b. a multimedia interface for enabling the consumer to modify and view the product information so as to determine whether the product is desired to the consumer;
   c. the plurality of consumers communicating using at least one of the following types of devices: a laptop, a PDA, a cell phone, a computer, a kiosk, a microphone, a camera, a video camera, an electronic billboard or other electronic platforms;
   d. the product information comprising multimedia brand information and the multimedia interface enabling the consumers to modify and display the multimedia brand information;
   wherein the product information, multimedia brand information, and the multimedia interface are updated based upon the consumer's actions and communicated to the sponsor, and wherein the sponsor dynamically administrates how the consumer modify and view the product information.

2. The interactive network as recited by claim 1, wherein the consumer can add multimedia product information to the network.

3. The interactive network as recited by claim 1, further comprising a chat feature.

4. The interactive network as recited by claim 1, wherein the multimedia interface enables the consumer to establish a virtual three-dimensional room for display of the product information.

5. The interactive network as recited by claim 1, wherein the product information and the multimedia interface form a projected image for viewing on a designated viewing area.

6. The interactive network as recited by claim 5, wherein the projected image is a GUI, the consumer being able to select objects and commands on the GUI and manipulate them by gesturing.

7. The interactive network as recited by claim 1, wherein the consumer can upload multimedia personal information and product information to the network.

8. The interactive network as recited by claim 7, wherein the uploaded multimedia personal information comprises an image of a room or other physical environment associated with the consumer and the product information comprises images from the sponsor such as staff members, automobiles, famous personalities, art, clothing or furniture and the consumer creates a virtual place, in the graffiti frame window, by incorporating the sponsor's images within the image of the consumer's uploaded environment.

9. The interactive network as recited by claim 1, wherein the sponsor dynamically controls a type and degree of modification made by the consumer.

10. The interactive network as recited by claim 1, wherein the sponsor dynamically turns on and off one or more tools provided for the consumer to make modification.

11. The interactive network as recited by claim 1, wherein:
   the product information includes a multimedia presentation of the product;

the multimedia interface includes an interface for editing the multimedia presentation of the product and for applying the multimedia presentation on an image of a user of the product.

12. The interactive network as recited by claim 11, wherein:
the multimedia interface also includes an interface for attaching a musical riff to the image being applied with the multimedia presentation of the product.

13. A non-transitory computer-readable medium for a computer-executable process for displaying product information to a plurality of consumers in a networked interactive system, wherein the computer-executable process being stored on the non-transitory computer-readable medium comprises the steps:
  a. connecting the consumers and at least one sponsor so that they can communicate with each other in a multimedia forum for advertising a product according to the product information;
  b. providing a multimedia interface to a consumer with which the consumer can modify and view the product information so as to determine whether the product is desired to the consumer;
  c. updating the product information and the multimedia interface based upon the consumer's actions;
  d. communicating the updating to the sponsor; and
  e. the consumers communicating using at least one of the following types of devices: a laptop, a PDA, a cell phone, a computer, a kiosk, a microphone, a camera, a video camera, an electronic billboard or other electronic platforms;
  wherein said product information comprises multimedia brand information, and said multimedia interface is capable of enabling said consumer to modify and display said multimedia brand information, and wherein the sponsor dynamically administrates how the consumer modify and view the product information.

14. The non-transitory computer-readable medium as recited by claim 13, wherein the multimedia interface enables the consumer to establish a virtual three-dimensional room for display of the product information.

15. The non-transitory computer-readable medium as recited by claim 13, wherein the product information and the multimedia interface form a projected image for viewing on a designated viewing area.

16. The non-transitory computer-readable medium as recited by claim 13, wherein the consumer can upload multimedia personal information and product information to the network.

17. The non-transitory computer-readable medium as recited by claim 13, wherein the sponsor dynamically controls a type and degree of modification made by the consumer.

18. The non-transitory computer-readable medium as recited by claim 13, wherein the sponsor dynamically turns on and off one or more tools provided for the consumer to make modification.

19. The non-transitory computer-readable medium as recited by claim 13, wherein:
the product information includes a multimedia presentation of the product;
the multimedia interface includes an interface for editing the multimedia presentation of the product and for applying the multimedia presentation on an image of a user of the product.

20. The non-transitory computer-readable medium as recited by claim 19, wherein:
the multimedia interface also includes an interface for attaching a musical riff to the image being applied with the multimedia presentation of the product.

* * * * *